US010526888B2

(12) United States Patent
Song et al.

(10) Patent No.: US 10,526,888 B2
(45) Date of Patent: Jan. 7, 2020

(54) DOWNHOLE MULTIPHASE FLOW SENSING METHODS

(71) Applicants: Limin Song, West Windsor, NJ (US); Yibing Zhang, Annandale, NJ (US); Mark M. Disko, Glen Gardner, NJ (US); Scott William Clawson, Califon, NJ (US); Katie M. Walker, Milford, NJ (US)

(72) Inventors: Limin Song, West Windsor, NJ (US); Yibing Zhang, Annandale, NJ (US); Mark M. Disko, Glen Gardner, NJ (US); Scott William Clawson, Califon, NJ (US); Katie M. Walker, Milford, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 183 days.

(21) Appl. No.: 15/666,328

(22) Filed: Aug. 1, 2017

(65) Prior Publication Data

US 2018/0058209 A1    Mar. 1, 2018

Related U.S. Application Data

(60) Provisional application No. 62/428,394, filed on Nov. 30, 2016, provisional application No. 62/381,330, (Continued)

(51) Int. Cl.
*E21B 47/16*    (2006.01)
*E21B 47/01*    (2012.01)
(Continued)

(52) U.S. Cl.
CPC .............. *E21B 47/16* (2013.01); *E21B 43/14* (2013.01); *E21B 47/011* (2013.01); *E21B 47/10* (2013.01);
(Continued)

(58) Field of Classification Search
CPC ........ E21B 47/16; E21B 47/10; E21B 47/101; E21B 43/14; E21B 47/011; E21B 47/06;
(Continued)

(56) References Cited

U.S. PATENT DOCUMENTS 3,103,643 A    9/1963    Kalbfell .......................... 340/17
3,205,477 A    9/1965    Kalbfell .......................... 340/18
(Continued)

FOREIGN PATENT DOCUMENTS

CN    102733799    6/2014    ............. E21B 47/16
EP    0636763    2/1995    ............. E21B 47/12
(Continued)

OTHER PUBLICATIONS

U.S. Appl. No. 15/666,334, filed Aug. 1, 2017, Walker, Katie M. et al.
(Continued)

*Primary Examiner* — Michael R Wills, III
(74) *Attorney, Agent, or Firm* — ExxonMobil Upstream Research Company—Law Department

(57) ABSTRACT

Provided are systems and methods for in-situ zonal assessment of multiphase fluid flow in one or more production zones of a production well, including for at least one production zone sensing one or more fluid flow parameters via at least one sensor disposed in a production zone; at least one sensor communications node being in electrical communication with an associated sensor, the at least one sensor communications node positioned along a tubular body in the production zone proximate an associated at least one sensor, and receiving signals from the associated at least one sensor; sending the acoustic signals from the at least one sensor communications node to a receiver at a surface via a series of intermediate communications nodes, node-to-node, the signals being indicative of one or more fluid flow parameters, the series of intermediate communications nodes being spaced along the tubular and configured to transmit acoustic waves; assessing one or more fluid flow parameters for the one or more production zones in response to signals received from a topside communications node.

35 Claims, 14 Drawing Sheets

Related U.S. Application Data filed on Aug. 30, 2016, provisional application No. 62/381,355, filed on Aug. 30, 2016, provisional application No. 62/428,367, filed on Nov. 30, 2016, provisional application No. 62/428,374, filed on Nov. 30, 2016, provisional application No. 62/433,491, filed on Dec. 13, 2016, provisional application No. 62/428,425, filed on Nov. 30, 2016.

(51) Int. Cl.

| | | |
|---|---|---|
| *E21B 43/14* | (2006.01) | |
| *E21B 47/10* | (2012.01) | |
| *G01P 5/16* | (2006.01) | |
| *G01F 1/74* | (2006.01) | |
| *E21B 47/06* | (2012.01) | |
| *G01F 1/56* | (2006.01) | |
| *G01F 1/66* | (2006.01) | |

(52) U.S. Cl.
CPC .............. *E21B 47/101* (2013.01); *G01F 1/74* (2013.01); *G01P 5/16* (2013.01); *E21B 47/06* (2013.01); *G01F 1/56* (2013.01); *G01F 1/66* (2013.01)

(58) Field of Classification Search
CPC ..... G01F 1/74; G01F 1/66; G01F 1/56; G01F 5/005; G01P 5/16; G01P 5/165
See application file for complete search history.

(56) References Cited

U.S. PATENT DOCUMENTS

| | | | |
|---|---|---|---|
| 3,512,407 A | 5/1970 | Zill | 73/152 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Peterson et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,745,012 B1 | 6/2004 | Dao et al. | |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Borkhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |

(56) References Cited

U.S. PATENT DOCUMENTS

| | | | |
|---|---|---|---|
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/114 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/12 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0149500 A1* | 10/2002 | Beique | E21B 17/14 340/854.5 |
| 2002/0180613 A1 | 12/2002 | Shi et al. | E21B 47/18 |
| 2002/0196743 A1 | 12/2002 | Thalanany et al. | |
| 2003/0056953 A1 | 3/2003 | Tumlin et al. | 166/298 |
| 2003/0067940 A1 | 4/2003 | Edholm | |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2006/0187755 A1 | 8/2006 | Tingley | |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0254604 A1 | 11/2007 | Kim | 455/88 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.1 |
| 2010/0013663 A1 | 1/2010 | Cavender et al. | 340/854.3 |
| 2010/0089141 A1 | 4/2010 | Rioufol et al. | 73/152.28 |
| 2010/0112631 A1 | 5/2010 | Hur et al. | 435/39 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0248172 A1 | 9/2013 | Angeles Boza et al. | |
| 2013/0278432 A1 | 10/2013 | Shashoua et al. | 340/853.7 |
| 2013/0319102 A1 | 12/2013 | Riggenberg et al. | 73/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |

(56) References Cited

U.S. PATENT DOCUMENTS

| | | | |
|---|---|---|---|
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 41/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow et al. | E21B 47/12 |
| 2016/0109606 A1 | 4/2016 | Market et al. | G01V 1/50 |
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |
| 2019/0112913 A1 | 4/2019 | Song et al. | E21B 47/01 |
| 2019/0112915 A1 | 4/2019 | Disko et al. | E21B 47/14 |
| 2019/0112916 A1 | 4/2019 | Song et al. | E21B 47/14 |
| 2019/0112917 A1 | 4/2019 | Disko et al. | E21B 47/14 |
| 2019/0112918 A1 | 4/2019 | Yi et al. | E21B 4/16 |
| 2019/0112919 A1 | 4/2019 | Song et al. | E21B 47/16 |
| 2019/0116085 A1 | 4/2019 | Zhang et al. | H04L 12/24 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| EP | 2763335 | 8/2014 | H04B 11/00 |
| WO | WO2001/03391 | 1/2001 | |
| WO | WO2002/027139 | 4/2002 | E21B 43/12 |
| WO | WO2004/033852 | 4/2004 | |
| WO | WO2010/074766 | 7/2010 | A41C 1/14 |
| WO | WO2013/079928 | 6/2013 | E21B 47/12 |
| WO | WO 2013/079928 A2 | 6/2013 | |
| WO | WO 2013/112273 A2 | 8/2013 | |
| WO | WO2013/162506 | 10/2013 | |
| WO | WO2014/018010 | 1/2014 | E21B 47/12 |
| WO | WO 2014/018010 A1 | 1/2014 | |
| WO | WO2014/049360 | 4/2014 | E21B 47/12 |
| WO | WO 2014/049360 A2 | 4/2014 | |
| WO | WO2014/100271 | 6/2014 | E21B 47/12 |
| WO | WO-2014100264 A1 * | 6/2014 | E21B 47/16 |
| WO | WO-2014100272 A1 * | 6/2014 | E21B 47/01 |
| WO | WO2014/134741 | 9/2014 | E21B 47/13 |
| WO | WO 2014/134741 A1 | 9/2014 | |
| WO | WO2015/117060 | 8/2015 | E21B 47/12 |

OTHER PUBLICATIONS

U.S. Appl. No. 16/175,441, filed Oct. 30, 2018, Song, Limin et al.

U.S. Appl. No. 16/175,467, filed Oct. 30, 2018, Kinn, Timothy F. et al.

U.S. Appl. No. 16/175,488, filed Oct. 30, 2018, Yi, Xiaohua et al.

U.S. Appl. No. 16/220,327, filed Dec. 14, 2018, Disko, Mark M. et al.

U.S. Appl. No. 16/220,332, filed Dec. 14, 2018, Yi, Xiaohua et al.

U.S. Appl. No. 16/269,083, filed Feb. 6, 2019, Zhang, Yibing.

U.S. Appl. No. 16/267,950, filed Feb. 5, 2019, Walker, Katie M. et al.

U.S. Appl. No. 62/782,153, filed Dec. 19, 2019, Yi, Xiaohua et al.

U.S. Appl. No. 62/782,160, filed Dec. 19, 2018, Hall, Timothy J. et al.

Arroyo, Javier et al. (2009) "Forecasting Histogram Time Series with K-Nearest Neighbours Methods," *International Journal of Forecasting*, v.25, pp. 192-207.

Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.

Arroyo, Javier et al. (2011) "Forecasting with Interval and Histogram Data Some Financial Applications," *Univ. of California, Dept. of Economics*, 46 pages.

Emerson Process Management (2011), "Roxar downhole Wireless PT sensor system," www.roxar.com, or downhole@roxar.com, 2 pgs.

Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.

Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.

Qu, X. et al. (2011) "Reconstruction fo Self-Sparse 20 NMR Spectra From undersampled Data in the Indirect Dimension", pp. 8888-8909.

U.S. Department of Defense (1999) "Interoperability and Performance Standards for Medium and High Frequency Radio Systems," *MIL-STD-188-141B*, Mar. 1, 1999, 584 pages.

* cited by examiner

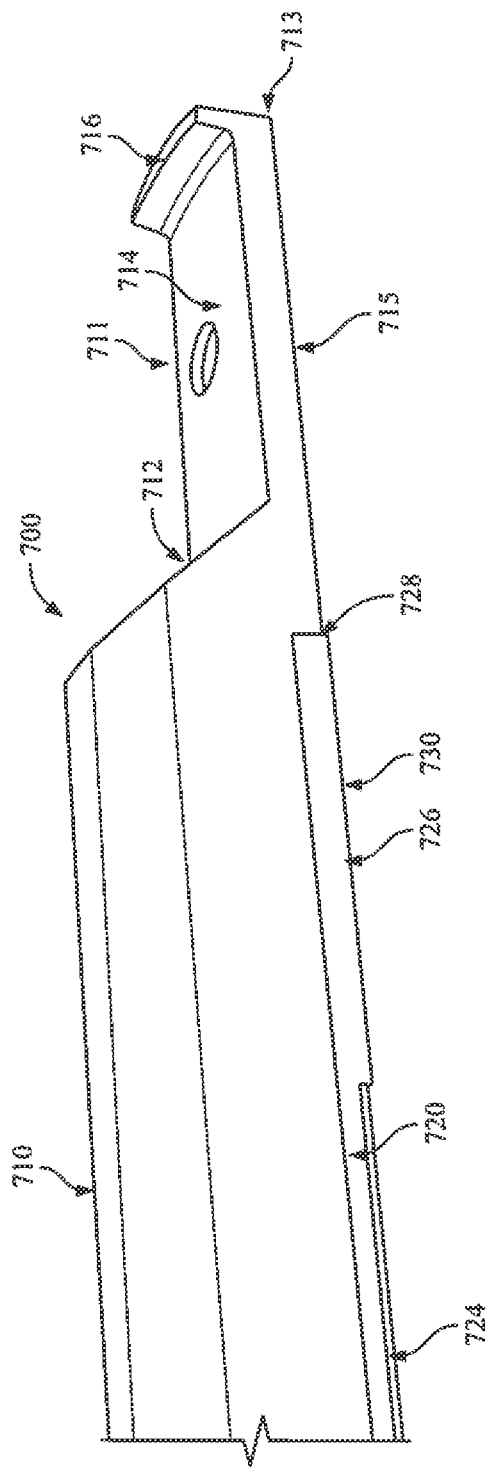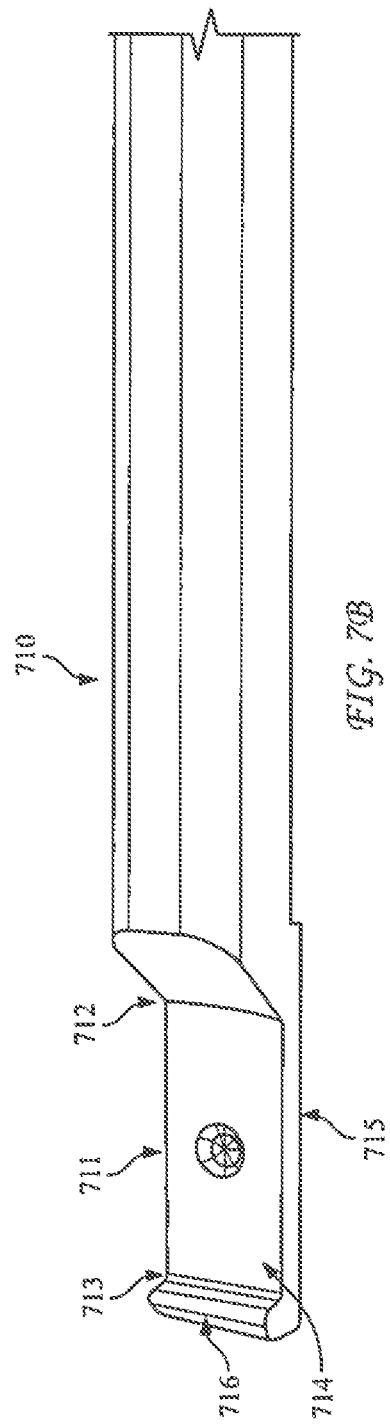

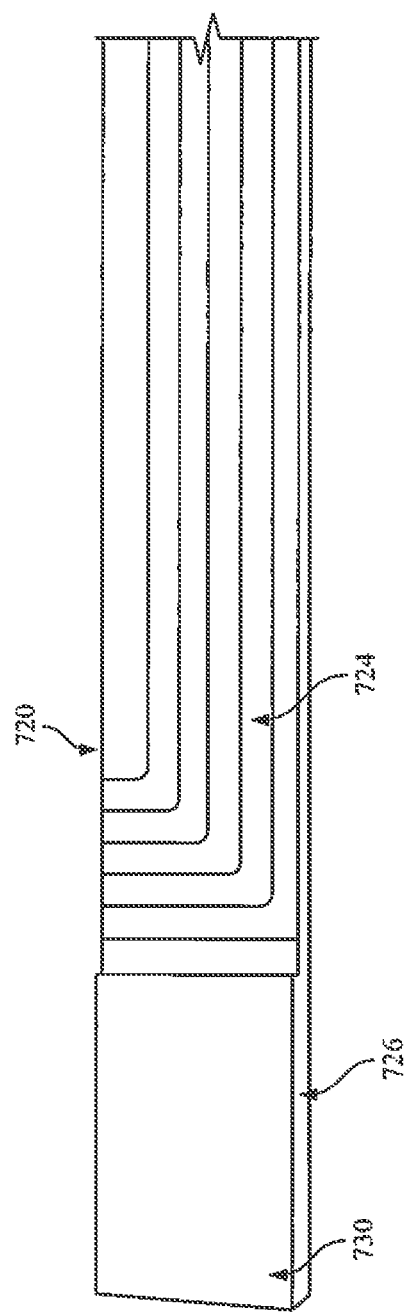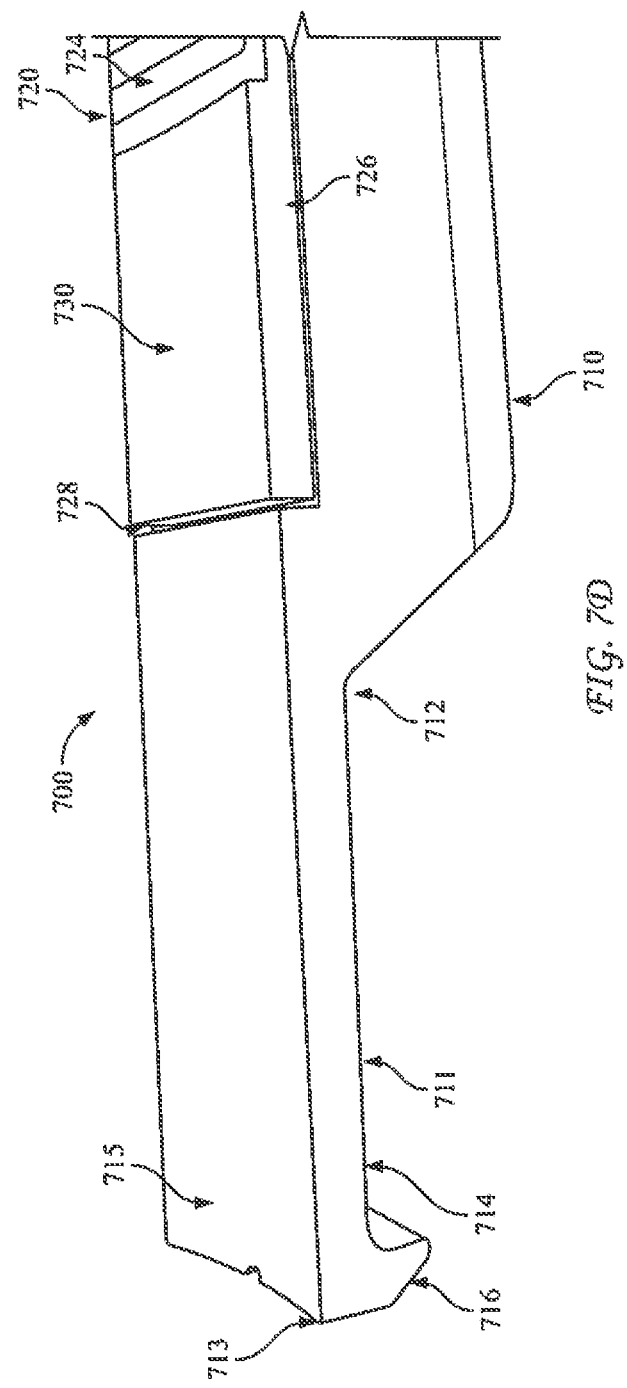

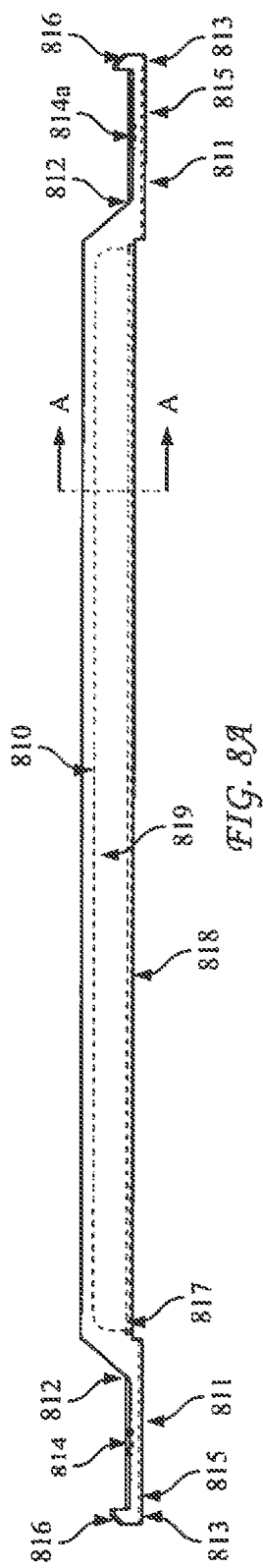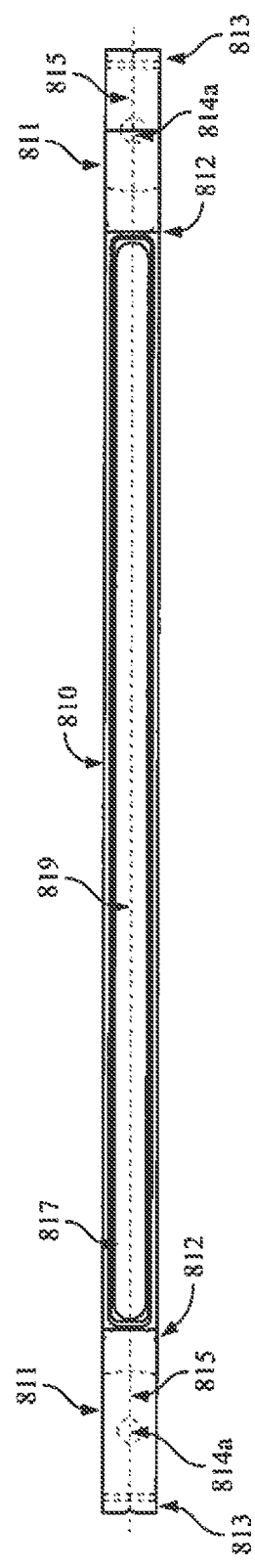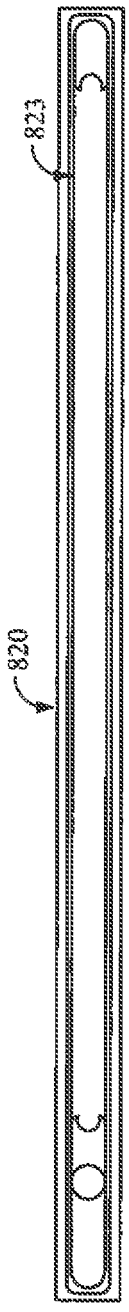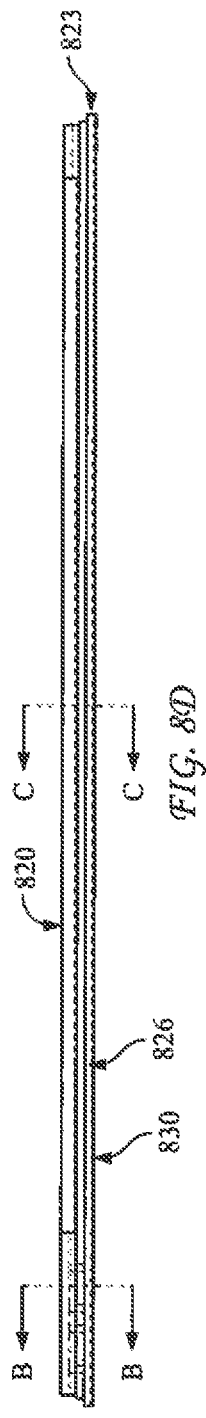
FIG. 8A
FIG. 8B
FIG. 8C
FIG. 8D

DOWNHOLE MULTIPHASE FLOW SENSING METHODS

CROSS REFERENCE TO RELATED APPLICATIONS

This application claims the benefit of U.S. Provisional Application Ser. No. 62/428,394, filed Nov. 30, 2016 entitled "Downhole Multiphase Flow Sensing Methods," U.S. Provisional Application Ser. No. 62/381,330 filed Aug. 30, 2016, entitled "Communication Networks, Relay Nodes for Communication Networks, and Methods of Transmitting Data Among a Plurality of Relay Nodes," U.S. Provisional Application Ser. No. 62/381,335, filed Aug. 30, 2016 entitled "Zonal Isolation Devices Including Sensing and Wireless Telemetry and Methods of Utilizing the Same," U.S. Provisional Application Ser. No. 62/428,367, filed Nov. 30, 2016, entitled "Dual Transducer Communications Node for Downhole Acoustic Wireless Networks and Method Employing Same," U.S. Provisional Application Ser. No. 62/428,374, filed Nov. 30, 2016, entitled "Hybrid Downhole Acoustic Wireless Network," U.S. Provisional Application Ser. No. 62/433,491, filed Dec. 13, 2016 entitled "Methods of Acoustically Communicating And Wells That Utilize The Methods," and U.S. Provisional Application Ser. No. 62/428,425 filed Nov. 30, 2016, entitled "Acoustic Housing for Tubulars," the disclosures of which are incorporated herein by reference in their entireties.

FIELD

The present disclosure relates generally to the field of data transmission along a tubular body within a wellbore, and in particular to in-situ downhole multiphase flow sensing methods.
Environment This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Multiphase flow measurement of a medium of mixture of multiple phases, including for example, a moving medium, is a challenging problem for downhole applications. To determine multiphase flow of a producing well requires information on, for example, the phase fraction, and velocity of the moving mixture. A conventional method of measuring multiphase flow is to use a separator on the surface to separate the gas, water and oil phases over a pre-determined time interval. This method requires interruption of production, can only be performed periodically, and combines flow sources from along the full length of the producing zone(s) of the well.

Methods to obtain in-situ, multiphase flow data of a producing well are described below.

SUMMARY

The presently described subject matter is directed to an in-situ system for assessing production conditions of one or more production zones of a fluid producing well comprising at least one production zone, the system comprising at least one sensor disposed along a tubular body in the production zone of the fluid producing well, each sensor configured to measure a parameter indicative of fluid flow within production tubing in that zone; at least one sensor communications node placed along and affixed to a wall of the tubular body in that production zone, the at least one sensor communications node being in communication with at least one associated sensor and configured to receive signals therefrom; a topside communications node; one or more intermediate communications nodes spaced along and attached to the wall of the tubular body, wherein the intermediate communications nodes are configured to transmit signals received from the sensor communications node(s) to the topside communications node, in substantially a node-to-node communications arrangement; a receiver at a well surface configured to receive signals from the topside communications node; and a topside data acquisition system structured and arranged to communicate with the topside communications node.

In one form, the fluid producing well is a multi-zone fluid producing well.

In another form, at least one sensor resides within the sealed housing of its associated sensor communications node.

In some forms, the well surface is an earth surface or a production platform offshore.

Advantageously, the one or more sensors for measuring a parameter indicative of fluid flow comprise one or more of (i) a fluid velocity measurement device; (ii) a temperature sensor; (iii) a pressure sensor; (iv) a fluid density sensor; (v) a microphone; (vi) an ultrasound sensor; (vii) a Doppler shift sensor; (viii) a chemical sensor; (ix) an imaging device; (x) an impedance sensor, (xi) an attenuation sensor; (xii) a fluid resistivity sensor, and (xiii) combinations thereof, wherein each of the one or more sensor communications nodes is configured to receive signals from the associated sensor, and transmit acoustic signals indicative of readings taken by the at least one sensor.

In some forms, each of the one or more intermediate communications nodes and/or each of the at least one sensor communications nodes are configured to transmit acoustic waves, radio waves, low frequency electromagnetic waves, inductive electromagnetic waves, light, or combinations thereof.

Additionally, each of the one or more intermediate communications nodes and each of the at least one sensor communications nodes are configured to transmit acoustic waves, providing near real-time information to the topside data acquisition system.

Conveniently, each of the one or more intermediate communications nodes and each of the at least one sensor communications nodes comprises a sealed housing, a power source residing within the sealed housing, and at least one electro-acoustic transducer.

In another form, each of the one or more intermediate communications nodes further comprises a transceiver associated with the at least one electro-acoustic transducer configured to receive and relay the acoustic waves.

Advantageously, the at least one sensor communications node further comprises a transceiver associated with the at least one electro-acoustic transducer that is configured to communicate with the at least one sensor and transmit acoustic waves in response thereto.

In some forms, the acoustic waves represent asynchronous packets of information comprising a plurality of separate tones, with at least some of the acoustic waves being indicative of a sensed parameter. For example, a frequency band for the acoustic wave transmission by the transceivers is about 25 KHz wide, and a frequency band for the acoustic wave transmission by the transceivers operates from about 80 kHz to 105 kHz.

Conveniently, the acoustic waves provide data that is modulated by (i) a multiple frequency shift keying method, (ii) a frequency shift keying method, (iii) a multi-frequency signaling method, (iv) a phase shift keying method, (v) a pulse position modulation method, or (vi) an on-off keying method.

In one form, each of the at least one sensors resides within the housing of its associated sensor communications node, and the electro-acoustic transducer within the associated sensor communications node converts signals from the sensor into acoustic signals for an associated transceiver.

In some forms, the at least one sensor comprises a flow probe and a material probe, such as where the flow probe comprises one or more pitot array sensors. Advantageously, the at least one sensor comprises a plurality of sensors, which can employ any of passive acoustic monitoring, active acoustic measurements, electrical-acoustic impedance measurements, electromagnetic signature detection, sonar monitoring, radar monitoring, or radiation monitoring.

Importantly, data transmitted topside is utilized by the topside data acquisition system for assessing production conditions of a production zone of a multi-zone fluid producing well.

Advantageously, the intermediate communications nodes are spaced apart such that each intermediate communications node resides on its own joint of production tubing, such as wherein the intermediate communications nodes are spaced at about 10 to 1,000 foot (3.0 to 304.8 meter) intervals, and the transceivers transmit data in acoustic form at a rate exceeding about 50 bps.

In one form, the topside communication node is located proximate a surface or downhole.

The system can further comprise one or more production optimization control devices for at least one production zone of the fluid producing well, which can be selected from an inflow control device, an autonomous inflow control device, an outflow control device, an actuated downhole shut-off valve, and an isolation device.

Additionally presented is an in-situ method for assessing production conditions of one or more production zones of a multi-zone fluid producing well, comprising sensing one or more fluid flow parameters via the at least one sensor positioned along a tubular body in at least one production zone of the multi-zone fluid producing well; receiving signals from the at least one sensor with at least one sensor communications node attached to a wall of the tubular body; transmitting the received signals via a transceiver to an intermediate communications node attached to the wall of the tubular body; relaying signals received by the intermediate communications node to an additional intermediate communications node via a transceiver; relaying signals received by the additional intermediate communications node to a topside communications node via a transceiver; assessing a production condition of each production zone in response to signals received from the topside communications node; and optimizing production performance of one or more production zones of the multi-zone fluid producing well.

In some forms of the method, the one or more fluid flow parameters comprise a material property and a flow rate.

Advantageously, each of the at least one sensors comprises a material probe and a flow probe to sense a material property and a flow rate, respectively, and the flow probe comprises one or more pitot array sensors.

In one form, the intermediate communications nodes are configured to transmit acoustic waves, radio waves, low frequency electromagnetic waves, inductive electromagnetic waves, light, or combinations thereof.

In another form, the step of transmitting the signals received from the one or more sensors via a transceiver employs the at least one sensor communications node configured to transmit acoustic waves, radio waves, low frequency electromagnetic waves, inductive electromagnetic waves, light, or combinations thereof.

In another form, the intermediate communications nodes and the at least one sensor communications node are configured to transmit acoustic waves, providing real-time information as to production conditions of a production zone.

Advantageously, each of the intermediate communications nodes comprises a sealed housing; a power source residing within the housing; and at least one electro-acoustic transducer, and optionally each of the intermediate communications nodes further comprises a transceiver associated with the at least one electro-acoustic transducer structured and arranged to receive and relay the acoustic waves.

Additionally, the at least one sensor communications node comprises a sealed housing; a power source residing within the housing; and at least one electro-acoustic transducer, and optionally the at least one sensor communications node further comprises a transceiver associated with the at least one electro-acoustic transducer that is structured and arranged to communicate with the at least one sensor and transmit acoustic waves in response thereto.

In one form, the acoustic waves represent asynchronous packets of information comprising a plurality of separate tones, with at least some of the acoustic waves being indicative of a sensed property.

Conveniently, the one or more sensors are selected from one or more of (i) a fluid velocity measurement device; (ii) a temperature sensor; (iii) a pressure sensor; (iv) a fluid density sensor; (v) a microphone; (vi) an ultrasound sensor; (vii) a Doppler shift sensor; (viii) a chemical sensor; (ix) an imaging device; (x) an impedance sensor, (xi) an attenuation sensor, (xii) a fluid resistivity sensor, and (xiii) combinations thereof.

In one form, each of the at least one sensor communications node is configured to receive signals from the associated sensor, and transmit acoustic signals indicative of readings taken by the at least one sensor, and can further comprise sending an acoustic signal from an intermediate communications node, and determining from the acoustic response a physical parameter of the multiphase flow.

The method can further comprise repeating the steps from above at a different time, and measuring the change in acoustic response to determine whether a physical change in fluid flow has occurred; for example, determining occurrence of a physical change in fluid flow and optimizing production performance of one or more production zones of the multi-zone production well.

In some forms, optimizing production performance comprises one or more of equalizing reservoir inflow along a length of the wellbore in one or more affected production zones, reducing flow from one or more affected production zones, reducing annular velocity in one or more affected production zones, and equalizing a pressure drop along a length of a wellbore in one or more affected production zones.

Additionally disclosed is an in-situ method for real time or near real-time monitoring of multiphase fluid flow in one or more production zones of a multi-zone fluid producing well, comprising attaching at least one sensor communications node to an outer wall of a tubular body proximate one or more production zones of the multi-zone fluid producing well and proximate an associated sensor, each sensor communications node being in electrical communication with the associated sensor and configured to receive signals from the associated sensor indicative of fluid flow; attaching a topside communications node to the outer wall of the tubular body proximate a well surface, or to an outer surface of a well head, or downhole to the outer wall of the tubular body; attaching a series of intermediate communications nodes to the outer wall of the tubular body according to a pre-designated spacing, each of the intermediate communications nodes configured to transmit acoustic waves from the sensor communications nodes up the tubular body and to the topside communications node, each of the intermediate communications nodes comprises a sealed housing, an electro-acoustic transducer and associated transceiver residing within the housing and configured to relay signals from node-to-node up the wellbore, with each signal representing a packet of information that comprises an acoustic waveform representing fluid flow data, and an independent power source also residing within the housing for providing power to the transceiver; for one or more production zones of the multi-zone fluid producing well, sensing one or more downhole fluid flow parameters via the at least one sensor; the least one sensor communications node receiving signals from the associated sensor; sending acoustic signals from the at least one sensor communications node to a receiver at a surface via the series of intermediate communications nodes and the topside communications node via node-to-node communications, the signals being indicative of one or more fluid flow parameters; assessing one or more fluid flow parameters for each production zone in response to signals received from the topside communications node; and optionally optimizing production performance of one or more production zones of the multi-zone fluid producing well. Advantageously, the method is performed in real-time.

This method can further comprise sending an acoustic signal from an intermediate communications node, and determining from the acoustic response a physical parameter of the multiphase flow, and optionally repeating the aforementioned steps at a different time, and measuring the change in acoustic response to determine whether a physical change in fluid flow has occurred.

In some forms, the method further comprises determining occurrence of a physical change in fluid flow and optimizing production performance of an affected one or more production zones of the multi-zone production well by one or more of equalizing reservoir inflow along a length of the wellbore in one or more affected production zones, reducing flow from one or more affected production zones, reducing annular velocity in one or more affected production zones, and equalizing a pressure drop along a length of a wellbore in one or more affected production zones.

Additionally disclosed is an in-situ method for zonal assessment of multiphase fluid flow in one or more production zones of a multi-zone production well, comprising for one or more production zones of the multi-zone production well sensing one or more fluid flow parameters via at least one sensor disposed in a production zone; receiving signals from the sensor with at least one sensor communications node being in electrical communication and associated with the sensor, the at least one sensor communications node positioned along a tubular body in the production zone proximate the sensor, and; sending acoustic signals from the at least one sensor communications node to a receiver at a well surface via a series of intermediate communications nodes and a topside communications node placed proximate the well surface or downhole via node-to-node communications, the signals being indicative of one or more fluid flow parameters, the series of intermediate communications nodes being spaced along the tubular body and configured to transmit acoustic waves; assessing one or more fluid flow parameters for the one or more production zones in response to signals received from the topside communications node; and optionally optimizing production performance of one or more production zones of the multi-zone fluid producing well.

Also disclosed is an electro-acoustic telemetry system for monitoring multiphase fluid flow in one or more production zones of a multi-zone production well, comprising a tubular body disposed in a wellbore, the tubular body being comprised of threadedly-connected pipe joints; at least one sensor disposed along the tubular body in each production zone of the multi-zone production well, each sensor configured to measure a parameter indicative of fluid flow within the production tubing; one or more sensor communications nodes placed along the tubular body proximate an associated sensor for each production zone, the one or more sensor communications nodes in electrical communication with the associated sensor and configured to receive signals from the associated sensor indicative of fluid flow; a topside communications node placed along the wellbore proximate a well surface or subsurface or downhole; a plurality of intermediate communications nodes spaced along the wellbore and attached to the tubular body, the intermediate communications nodes configured to transmit acoustic waves via node-to-node communications from the one or more sensor communications nodes to the topside communications node, wherein each of the intermediate communications nodes comprises a sealed housing; an electro-acoustic transducer and associated transceiver residing within the housing, the transceiver being configured to relay signals from node-to-node up the wellbore, with each signal representing a packet of information that comprises an acoustic waveform representing fluid flow data; and an independent power source residing within the housing providing power to the transceiver.

Additionally disclosed is an in-situ method for assessing production conditions of one or more production zones of a multi-zone fluid producing well, comprising sensing one or more fluid flow parameters via the at least one sensor positioned along the tubular body in the production zone for at least one production zone of the multi-zone fluid producing well; receiving signals from the at least one sensor with the at least one sensor communications node for the at least one production zone of the multi-zone fluid producing well; transmitting those signals via a transceiver to an intermediate communications node attached to a wall of the tubular body; relaying signals received by the intermediate communications node to at least one additional intermediate communications node via a transceiver; relaying signals received by the additional intermediate communications node to a topside communications node via a transceiver; assessing a production condition of each production zone in response to signals received from the topside communications node; and optimizing production performance of one or more production zones of the multi-zone fluid producing well.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation.

The forms disclosed herein are illustrated by way of example, and not by way of limitation, in the figures of the accompanying drawings and in which like reference numerals refer to similar elements and in which:

Figure 1A:
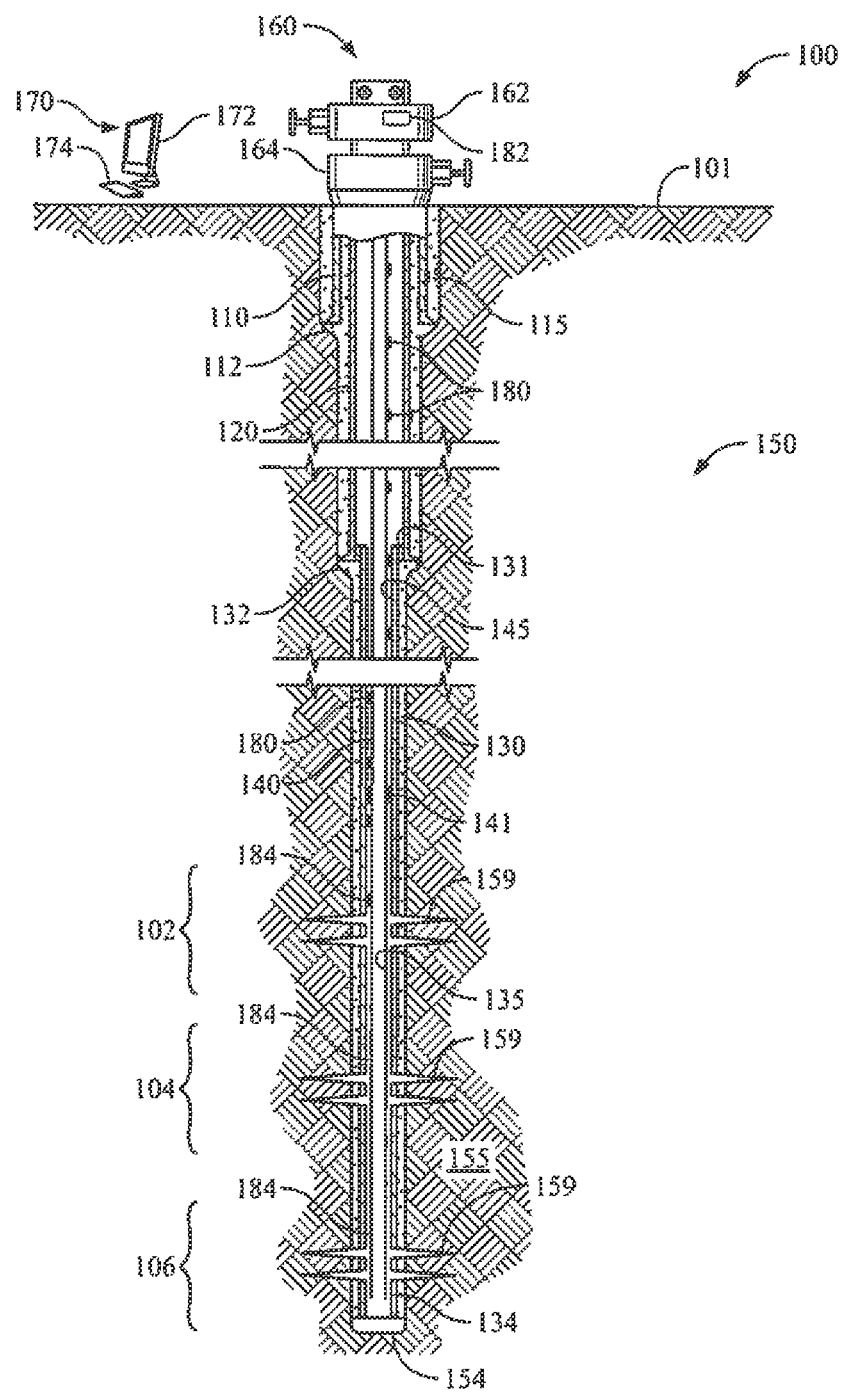
Figure 1B:
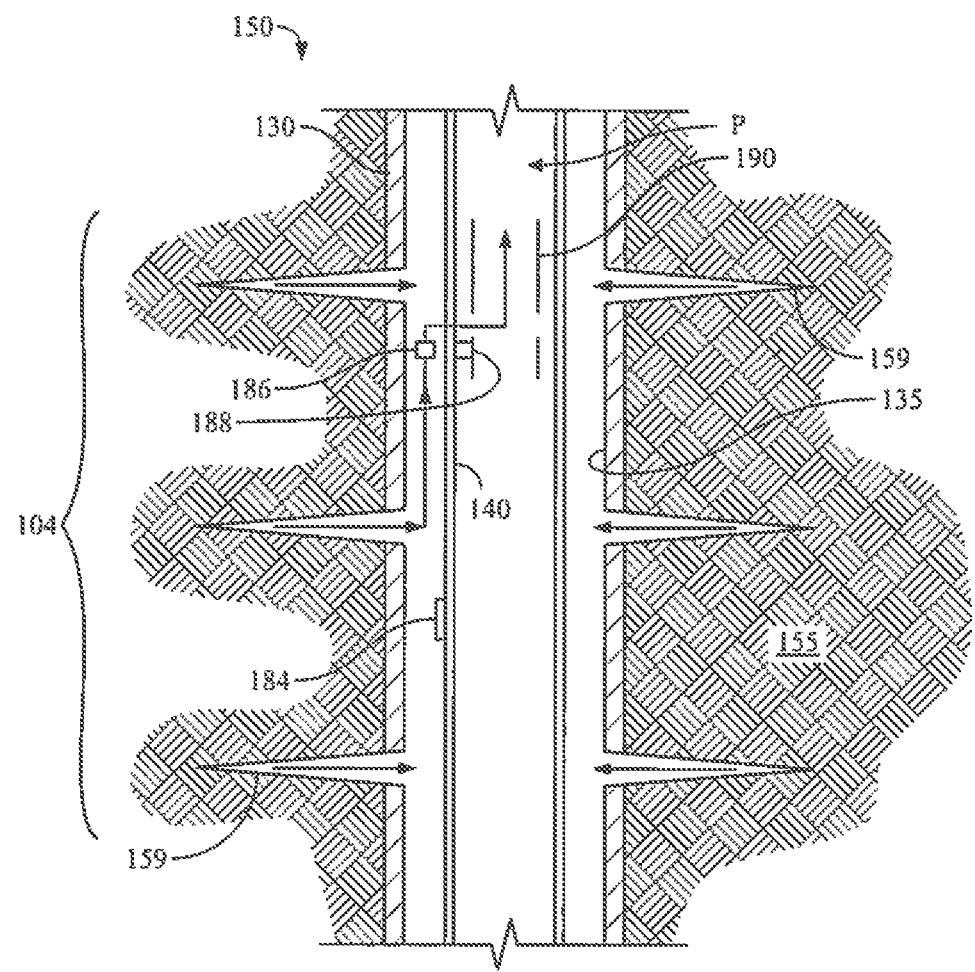
Figure 2:
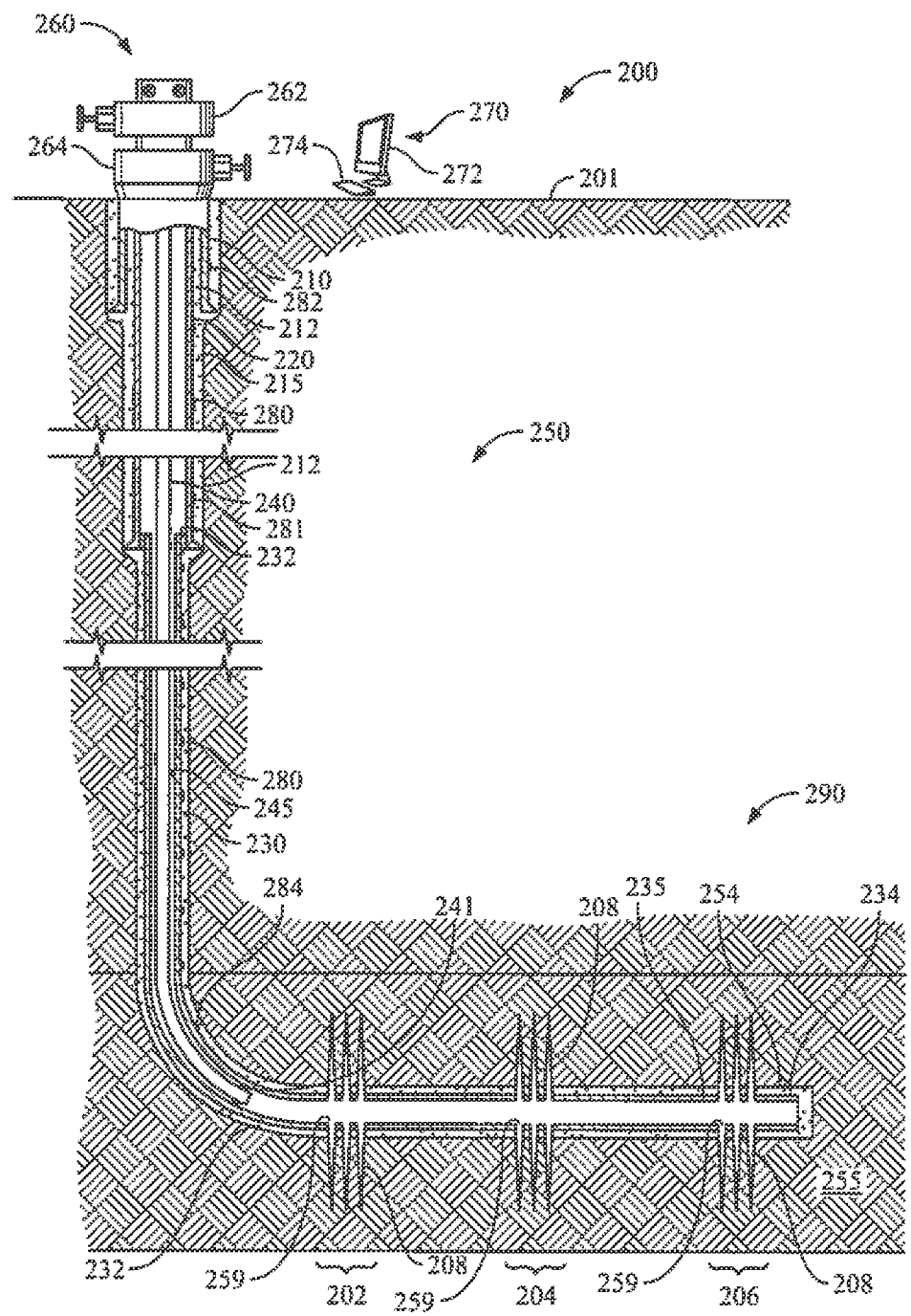
Figure 3:
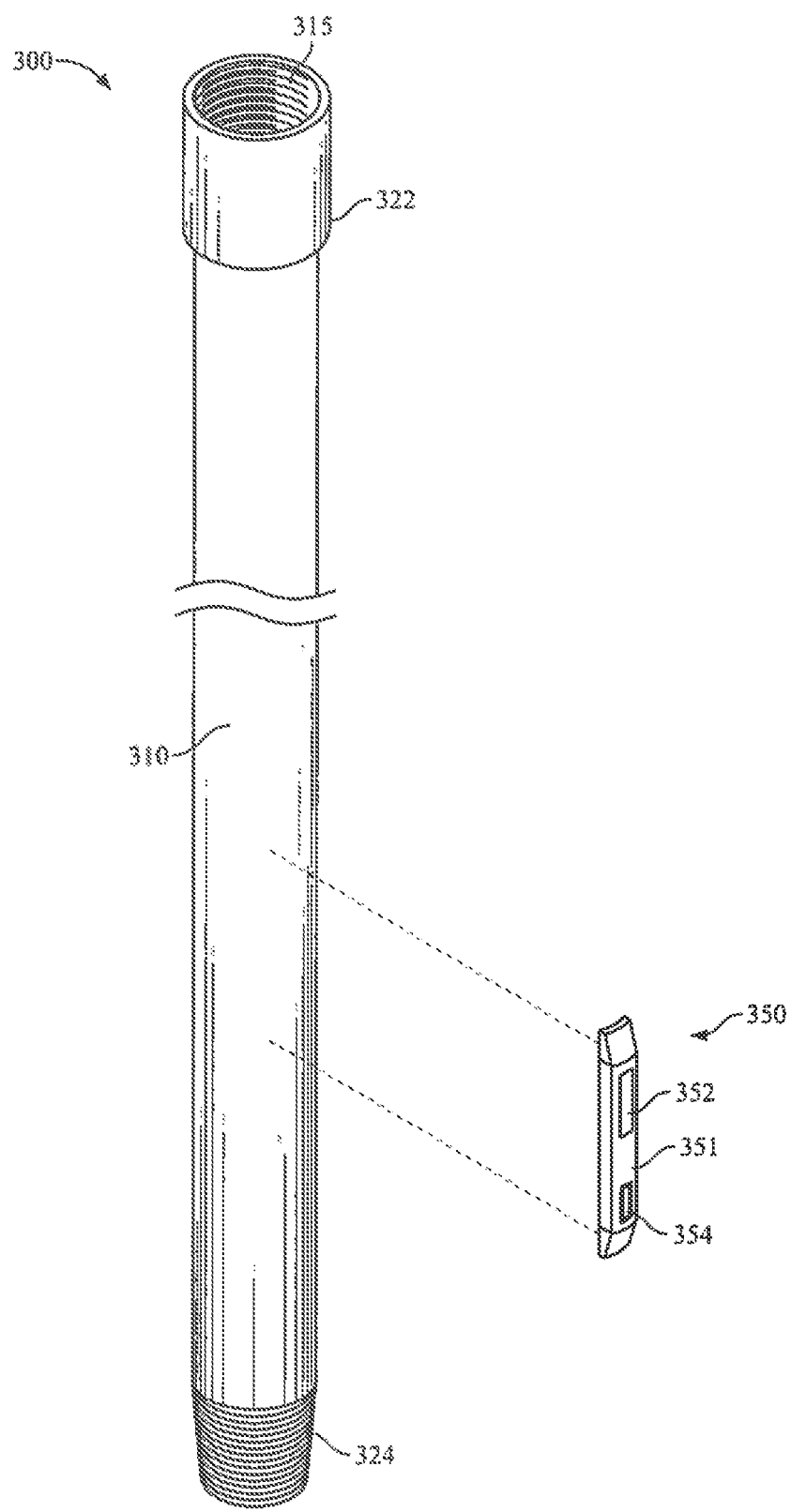
Figure 4A:
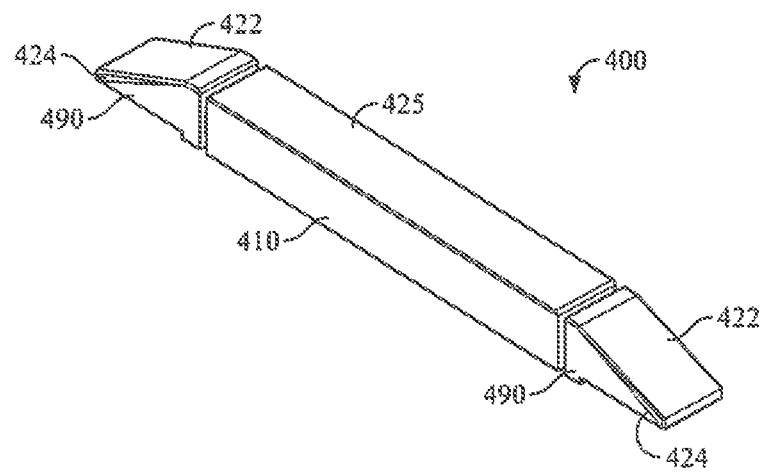
Figure 4B:
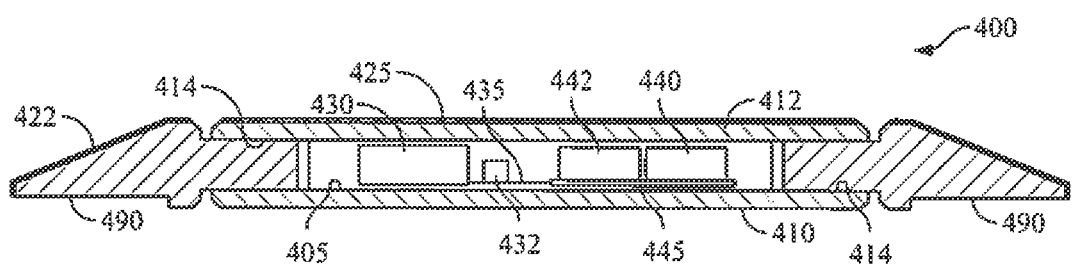
Figure 4C:
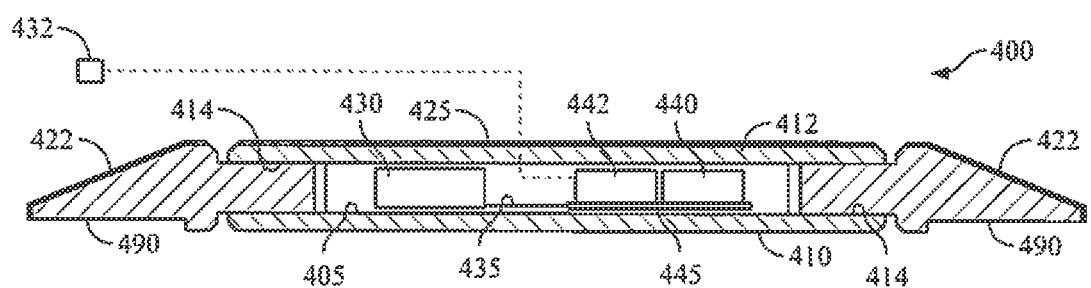
Figure 5A:
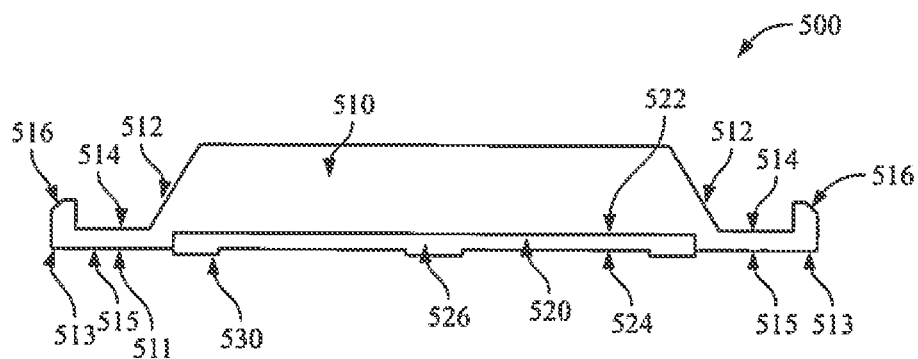
Figure 5B:
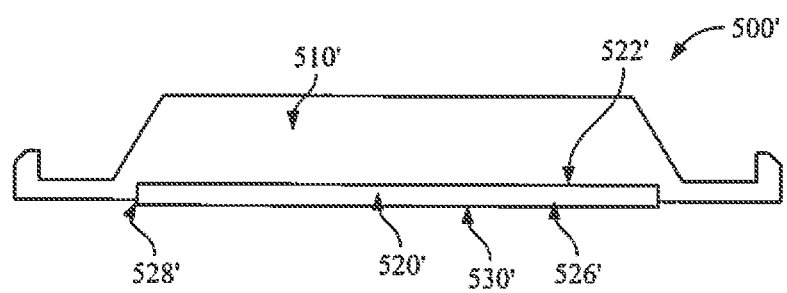
Figure 6:
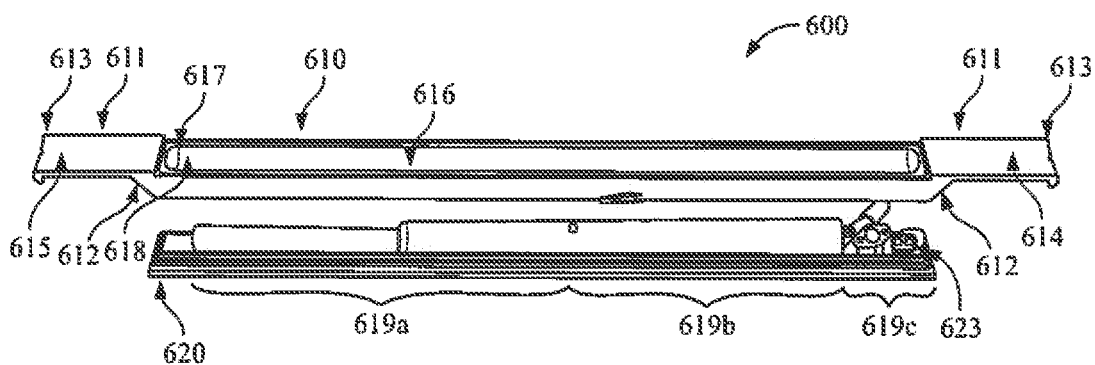
Figure 8E:
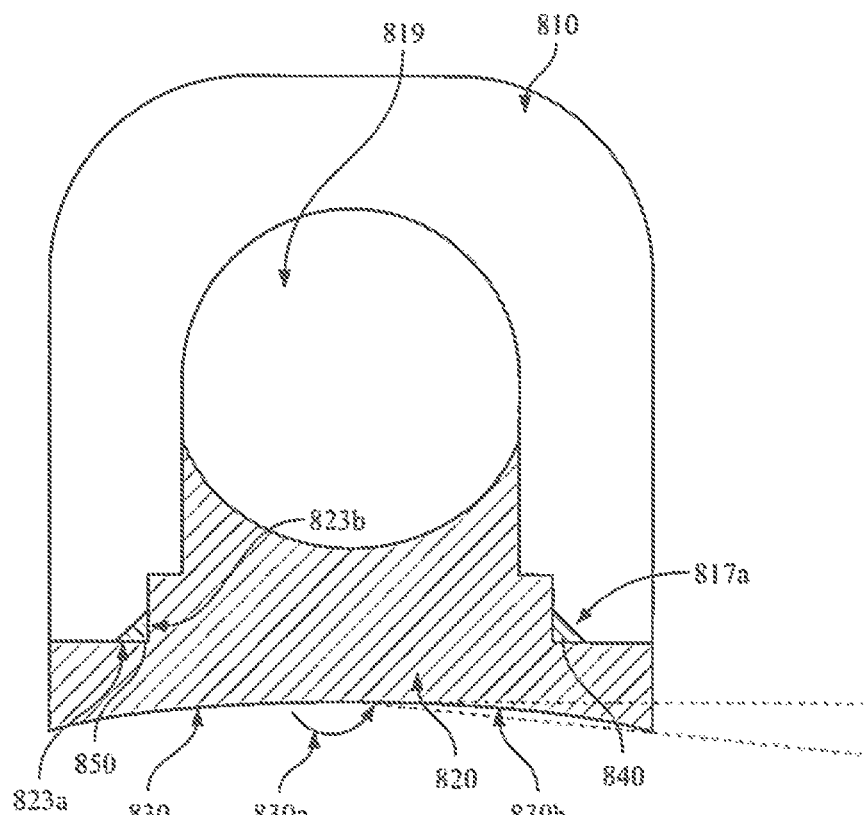
Figure 8F:
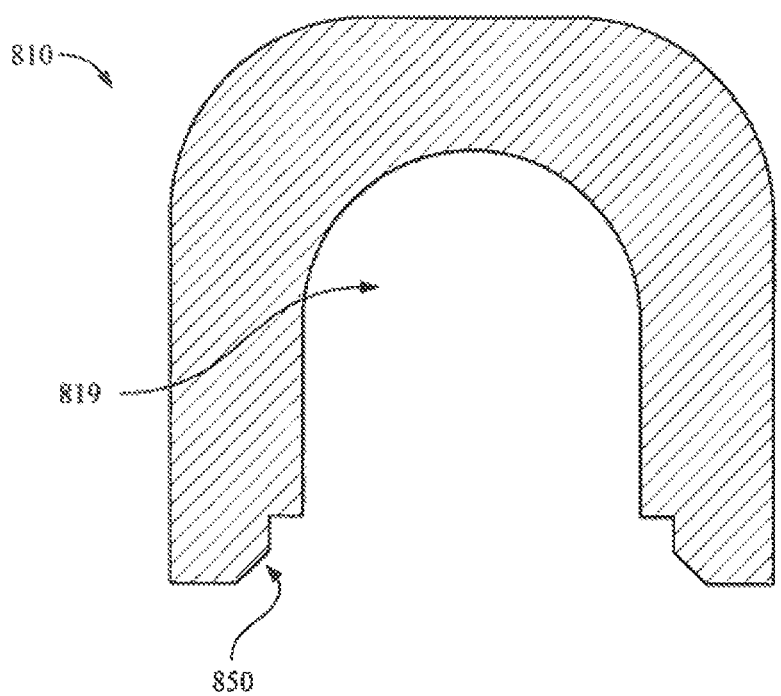
Figure 8G:
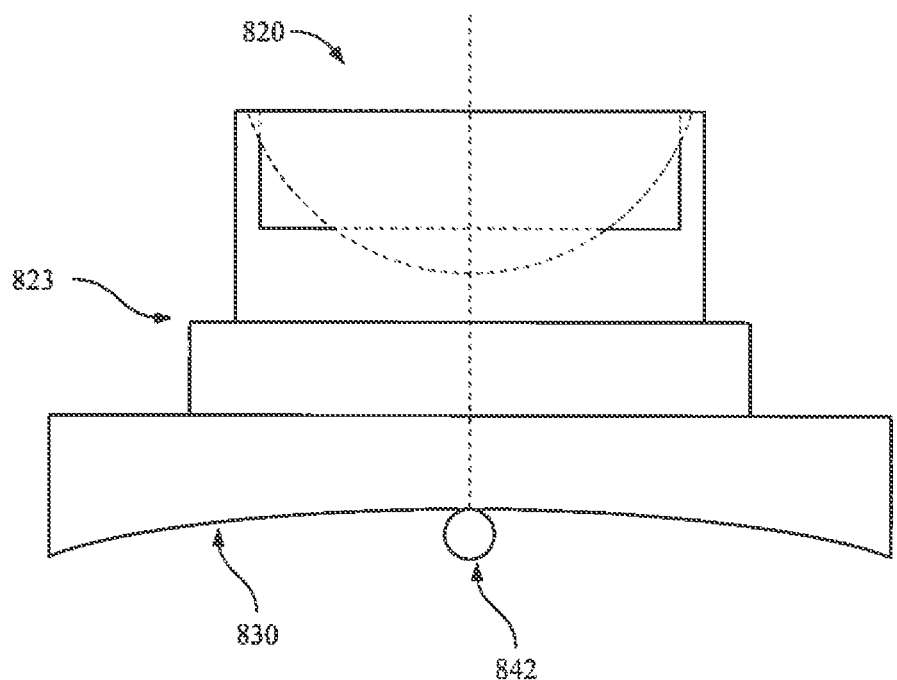
Figure 9:
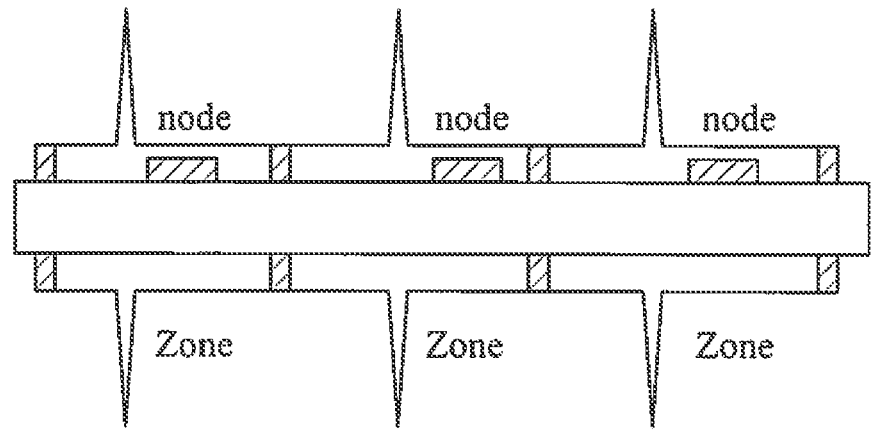
Figure 10:
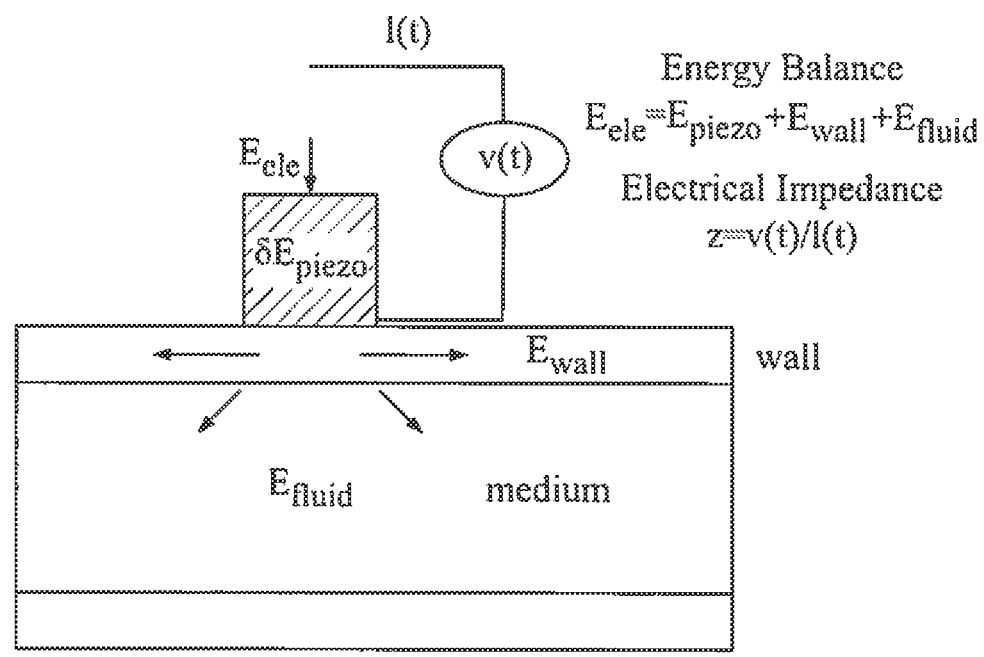
Figure 11:
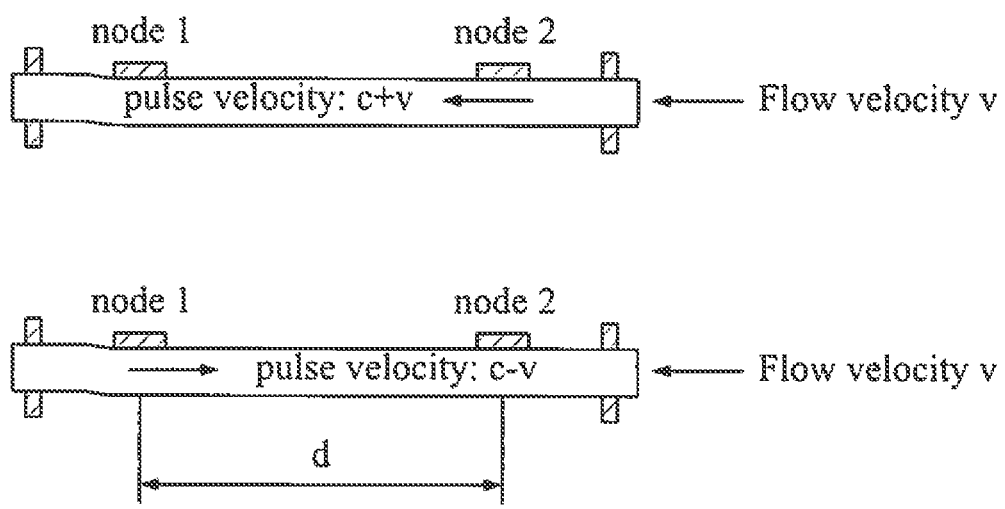
Figure 12:
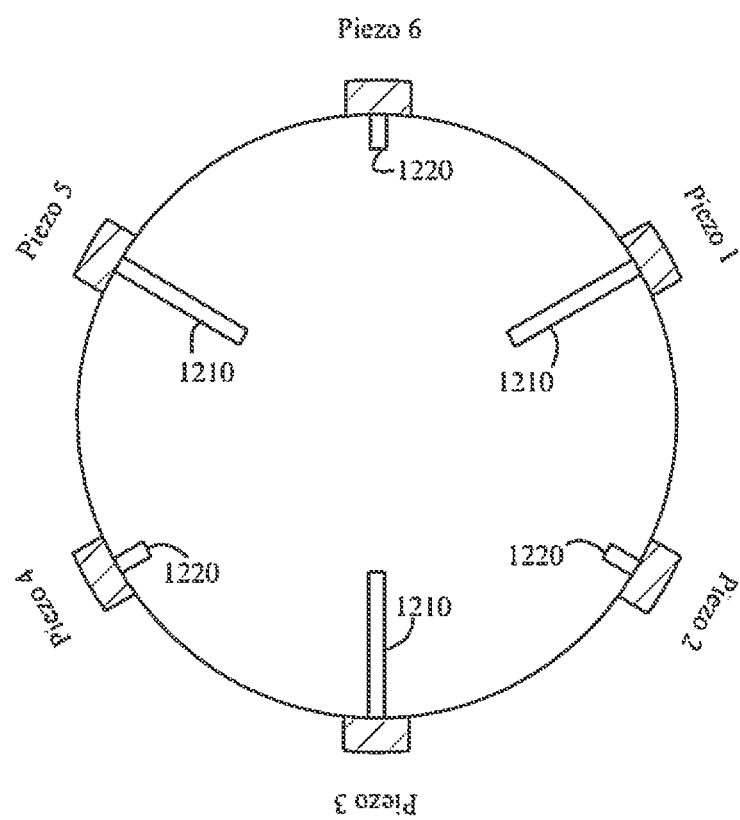

FIG. 1A is a side, cross-sectional view of an illustrative, nonexclusive example of a wellbore. The wellbore is completed substantially vertically, and has a string of tubing therein. The tubing may be production tubing. A series of communications nodes is placed along the tubing as part of a telemetry system;

FIG. 1B is an illustrative, nonexclusive example of an enlarged cross-sectional view of a portion of the illustrative wellbore of FIG. 1A. Here, a selected production zone within a subsurface formation is seen more clearly;

FIG. 2 presents is a cross-sectional view of another illustrative, nonexclusive example of wellbore having been completed. The illustrative wellbore has been completed as a horizontal completion. A series of communications nodes is placed along the casing string as part of a telemetry system;

FIG. 3 is a perspective view of an illustrative, nonexclusive example of a wellbore tubular joint. A communications node of one aspect of the presently described subject matter is shown exploded away from the casing joint;

FIG. 4A is a perspective view of a communications node as may be used in the wireless data transmission system of the presently described subject matter, in an alternate embodiment;

FIG. 4B is a cross-sectional view of the communications node of FIG. 4A. The view is taken along the longitudinal axis of the node. Here, a sensor is provided within the communications node;

FIG. 4C is another cross-sectional view of the communications node of FIG. 4A. The view is again taken along the longitudinal axis of the node. Here, a sensor resides along the wellbore external to the communications node;

FIG. 5A presents a side view of an illustrative, nonexclusive example of an alternative communications node;

FIG. 5B presents a side view of an additional illustrative, nonexclusive example of a communications node, according to the present disclosure;

FIG. 6 presents a perspective view of an illustrative, nonexclusive example of a communications node before the body and the cover are sealed together, according to the present disclosure, FIG. 7A presents a perspective partial view of a further illustrative, nonexclusive example of a communications node, according to the present disclosure;

FIG. 7B presents a perspective partial view of an illustrative, nonexclusive example of a housing body, according to the present disclosure;

FIG. 7C presents a partial bottom view of an illustrative, nonexclusive example of a housing cover, according to the present disclosure;

FIG. 7D presents a perspective partial bottom view of an illustrative, nonexclusive example of a communications node including a body and a cover, according to the present disclosure;

FIGS. 8A-D present a side view of a housing body (FIG. 8A), a bottom view of the housing body (FIG. 8B), a top-down view of the housing cover (FIG. 8C), and a side view of the housing cover (FIG. 8D), according to the present disclosure;

FIG. 8E presents a cross-section view of an illustrative, nonexclusive example of a housing including a body and a cover sealed with a sealing material, according to the present disclosure;

FIG. 8F presents a cross-section view of an illustrative, nonexclusive example of a housing body taken along section a-a of FIG. 8A, according to the present disclosure;

FIG. 8G presents a cross-section view of an illustrative, nonexclusive example of a housing cover taken along section b-b of FIG. 8D, according to the present disclosure;

FIG. 9 presents an illustrative, nonexclusive example of the strategic placement of sensor communications in each production zone or a multi-zone well, according to the present disclosure;

FIG. 10 presents an illustrative, nonexclusive example of impedance measurement for material identification, according to the present disclosure;

FIG. 11 presents an illustrative, nonexclusive example of sound speed and flow velocity measurement, according to the present disclosure; and FIG. 12 presents an illustrative, nonexclusive example of measuring flow distribution across a tubular using multiple inserted pitot-tube like sensors, according to the presently described subject matter.

DETAILED DESCRIPTION

In general, structures and/or features that are or are likely to be, included in a given embodiment are indicated in solid lines in the figures, while optional structures and/or features are indicated in broken lines. However, a given embodiment is not required to include all structures and/or features that are illustrated in Terminology/Definitions.

Terminology

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude for the degree of deviation provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C," "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Chemical bonding material: As used herein, the term "chemical bonding material" refers to a chemical bonding material that is capable of sealing a housing body and housing cover as described herein and is able to withstand downhole conditions including, but not limited to, heat, high pressure, and corrosive elements, without significant failure. The chemical bonding material may facilitate or allow the transmission of ultrasonic energy. Suitable chemical bonding materials can include, but are not limited to, one or more of an epoxy.

Communications Node: As used herein, the term communications node can be used to generically refer to a topside communications node, an intermediate communications node, and/or a sensor communications node.

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Any device or method or system described herein can be comprised of, can consist of, or can consist essentially of any one or more of the described elements.

Configured: As used herein the term "configured" means that the element, component, or other subject matter is designed to perform a given function. Thus, the use of the term "configured" should not be construed to mean that a given element, component, or other subject matter is simply "capable of" performing a given function but that the element, component, and/or other subject matter is specifically selected, created, implemented, utilized, programmed, and/or designed to perform that function.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Exemplary: "Exemplary" is used exclusively herein to mean "serving as an example, instance, or illustration." Any embodiment described herein as "exemplary" is not necessarily to be construed as preferred or advantageous over other embodiments.

Flow: As used herein, the term "flow" refers to a current or stream of a fluid. Flow can be understood as the quantity of a fluid that passes a point per unit time. Factors that affect flow can include, but are not limited to, pressure (flow is directly proportional to the pressure difference across a tube), radius (flow is directly proportional to the fourth power of the radius of a tube), length (flow is inversely proportional to the length of a tube), viscosity (flow is inversely proportional to the viscosity of the fluid), temperature of the fluid, fluid density, compressibility of the fluid, single phase or multiphase fluid, friction, and chemical properties of the fluid.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, and may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time. In some examples, methods may be implemented as processor executable instructions. Thus, a machine-readable medium may store processor executable instructions that if executed by a machine (e.g., processor) cause the machine to perform a method.

Flow probe: As used herein, the term "flow probe" refers to one or more sensors for measuring a parameter related to local flow. Such flow parameters may include, fluid velocity, volumetric or mass flow rates of individual phases of a multiphase fluid through a pipe, density, relative density, weight density, acoustic impedance, impedance, viscosity, dynamic viscosity, density, temperature, multiphase flow type, and the like.

Suitable flow probes can include sensors including, but are not limited to, one or more of a multiphase flow meter for measuring or monitoring the volumetric or mass flow rates of individual phases of a multiphase fluid through a pipe, differential pressure meters, pitot tubes, pitot array sensors, ultrasound Doppler, gamma ray absorption, fluid density, and the like. The mass flow rates of the phases can be computed by measuring component densities.

Flow rate: As used herein, the term "flow rate" refers to the speed or velocity, of fluid flow through a pipe or vessel.

Fluid: As used herein, the term "fluid" refers to gases, liquids, and combinations of gases and liquids, as well as to combinations of gases and solids, combinations of liquids and solids, and combinations of gases, liquids, and solids.

Fluid flow measurement: As used herein, the term "fluid flow measurement" refers to measuring one or more fluid flow parameters including but not limited to, one or more of velocity, volume, pressure, resistivity, vibration, pressure drop, temperature, impedance, attenuation, density, viscosity, flow type, and the like. Such measurements can be used to determine, for example, fluid velocity, fluid composition, phase fraction, annular distribution of flows and phases across a cross-section, flow rate, and the like. This information can be used to diagnose downhole fluid production performance issues as described herein.

Formation: As used herein, the term "formation" refers to any definable subsurface region. The formation may contain one or more hydrocarbon-containing layers, one or more non-hydrocarbon containing layers, an overburden, and/or an underburden of any geologic formation.

Formation fluid: As used herein, the term "formation fluid" refers to fluid, e.g., gas, oil, or water that exists in a subsurface formation.

Full-physics: As used herein, the term "full-physics," "full physics computational simulation," or "full physics simulation" refers to a mathematical algorithm based on first principles that impact the pertinent response of the simulated system.

Hydrocarbon: As used herein, the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur. Examples of hydrocarbon-containing materials include any form of natural gas, oil, coal, and bitumen that can be used as a fuel or upgraded into a fuel.

Hydrocarbon fluids: As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (15° C. to 20° C. and 1 atm pressure). Hydrocarbon fluids may include, for example, oil, natural gas, gas condensates, coal bed methane, shale oil, shale gas, pyrolysis oil, pyrolysis gas, a pyrolysis product of coal, and other hydrocarbons that are in a gaseous or liquid state.

Inflow control device or valve: As used herein, the term "inflow control device" or "inflow control valve" (ICD)

refers to control device that is a component installed as part of a well completion to optimize production by equalizing reservoir inflow along the length of the wellbore. Multiple inflow control devices can be installed along the reservoir section of the completion, with, for example, each device employing a specific setting to partially choke flow. The resulting arrangement can be used to delay water or gas breakthrough by reducing annular velocity across a selected interval such as the heel of a horizontal well. Inflow control devices can be used with sand screens on openhole completions. ICDs can enable the adjustment of flow from individual zones of a production well including one or more production zones of a multi-zone production well, that are over- or under-pressured or from those producing water or gas that may be detrimental to overall well productivity. Downhole inflow control devices can slow water and gas encroachment and reduce the amount of bypassed reserves by equalizing a pressure drop along a length of a wellbore, so as to promote uniform flow of oil and gas through a formation so that the arrivals of water and gas are delayed and simultaneous. Suitable ICDs include, but are not limited to, one or more of passive ICDs, nozzle-based ICDs, orifice ICDs, channel ICDs, helical-channel ICDs, ResFlow ICDs, autonomous ICDs (AICDs), and ICDs that are tube-channel and orifice-nozzle combinations. ICDs suitable for use according to the presently described subject matter can include EQUIFLOW autonomous ICDs (Halliburton ICDs) can be used to manage fluid outflow in injection wells. ICDs can be placed both in injection and producer wells.

Fluid flow from one or more well zones can be shut off or reduced using one or more remotely actuated downhole valves.

The presently described systems and methods can include and/or utilize for example, but are not limited to, one or more control devices, including for example, one or more of inflow control devices, autonomous inflow control devices, outflow control devices, valves and corresponding actuation devices, wellbore isolation devices including for example, tool seals, packers, cement plugs, bridge plugs, chemical control devices, and the like as described herein.

Gas: As used herein, the term "gas" refers to a fluid that is in its vapor phase.

May: Note that the word "may" is used throughout this application in a permissive sense (i.e., having the potential to, being able to), not a mandatory sense (i.e., must).

Material probe: As used herein, the term "material probe" refers to one or more sensor devices or methods that can measure a parameter related to material properties, e.g., surrounding the material probe or sensor communications node containing the material probe. For example, a material probe can measure acoustic energy loss to a surrounding medium, e.g., a hydrocarbon containing fluid. Such material parameters may include, but are not limited to, one or more of acoustic impedance, impedance, acoustic noise, density, weight density, relative density, pressure, viscosity, salinity, and the like.

The material probe can include but is not limited to, a sensing device and/or method that measures the acoustic energy loss to the surrounding fluid medium, the fluid medium including for example, but not limited to, gas, water, oil, or a mixture thereof, and uses that data to determine the nature of the fluid medium, i.e., whether the medium includes gas, water, oil, or a mixture thereof. Suitable material probes can include but are not limited to piezoelectric transducers. Acoustic energy loss to the fluid can be determined by methods including but not limited to, for example, measuring electrical impedance of the piezo (See FIG. 10), and measuring acoustic attenuation with, for example, a Pulse-Echo/Tx-Rx method. Each method serves to identify the components of the fluid medium.

Multiphase flow type: As used herein, the term "multiphase flow type" refers to multiphase horizontal and vertical flow regimes, including for example, stratified flow regimes including stratified and stratified wavy flow; intermittent flow regimes including plug and slug flow regimes; bubbly flow; annular flow; annular mist and mist flow. An additional vertical flow pattern is churn flow. Multiphase flow may also be homogeneous.

Multiphase fluid: As used herein, the term "multiphase fluid" refers to a mixture of any of crude oil, associated gas, and water. The mixture can include hydrocarbons and/or non-hydrocarbons. The mixture can also contain one or more of salts and mechanical impurities such as solids including for example, sand, and wax, etc.

Multiphase fluid flow: As used herein, the term "multiphase fluid flow" refers to the number of mobile fluids present in a reservoir or tube, and can include two-phase fluid flow, e.g., oil-water, oil-gas, or gas-water; or three-phase fluid flow, e.g., oil-water-gas. Other components may be present including solids.

Multi-zone fluid producing well: As used herein, the term "multi-zone fluid producing well" or "multi-zone production well" refers to a hydrocarbon producing well that includes at least two production zones.

Near real time: As used herein, the terms "near real-time" and "real-time" are used interchangeably and refer to the systems and methods, including the presently described systems and methods, where the time delay introduced, by automated data processing or network transmission, between the occurrence of an event and the use of the processed data, such as for display or feedback and control purposes. For example, a near-real-time or real-time display depicts an event or situation as it existed at the current time minus the processing time, as nearly the time of the live event. The time delay with regard to "near real-time" or "real-time" can be on the order of several milliseconds to several minutes, several milliseconds to several seconds, or several seconds to several minutes.

Oil: As used herein, the term "oil" refers to a hydrocarbon fluid including a mixture of condensable hydrocarbons.

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited. It is within the scope of the present disclosure that an individual step of a method recited herein may additionally or alternatively be referred to as a "step for" performing the recited action.

Parameter: As used herein, the term "parameter" refers to a parameter indicative of fluid flow which may include, but is not limited to, one or more of phase, velocity, volumetric flow rate, composition, pressure, pressure drop, viscosity, density, impedance, attenuation, temperature, vibration, resistivity, flow type, or other parameter, measured at, for example, one or more locations along a tubular, including for example, at one or more production zones.

Pitot array sensor: As used herein, the term "pitot array sensor" refers to sensor two or more pitot-tubes each inserted at a different depth into a tubular about its circumference, in a single plane or staggered along the length of a production zone of the multi-zone production well. A plurality of pitot-tubes can include, but is not limited to, from 2 to 30 tubes, from 3 to 25 tubes, from 3 to 20 tubes, from 4 to 15 tubes, from 5 to 10 tubes, from 3 to 15 tubes, from 5 to 15 tubes, from 5 to 20 tubes, from 5 to 7 tubes, 3 tubes, 4 tubes, 5 tubes, 6 tubes, 7 tubes, 8 tubes, 9 tubes, 10 tubes, 11 tubes, 12 tubes, 13 tubes, 14 tubes, 15 tubes, 16 tubes, 17 tubes, 18 tubes, 19 tubes, or 20 pitot tubes. Each inserted pitot tube is in communication with a respective piezoelectric transducer provided on the outside of the tubular, e.g., clamped or otherwise attached, e.g., mechanically or chemically. The plurality of pitot tubes, each in communication with a respective piezoelectric transducer, is referred to herein as a "pitot array sensor."

Two or more pitot-tube like devices can be inserted at different depths into a tubular about its circumference, in a single plane or staggered along the length of a production zone of the multi-zone production well. A plurality of pitot-tubes can be inserted, including but not limited to, from 2 to 30 tubes, from 3 to 25 tubes, from 3 to 20 tubes, from 4 to 15 tubes, from 5 to 10 tubes, from 3 to 15 tubes, from 5 to 15 tubes, from 5 to 20 tubes, from 5 to 7 tubes, 3 tubes, 4 tubes, 5 tubes, 6 tubes, 7 tubes, 8 tubes, 9 tubes, 10 tubes, 11 tubes, 12 tubes, 13 tubes, 14 tubes, 15 tubes, 16 tubes, 17 tubes, 18 tubes, 19 tubes, or 20 pitot tubes. Each inserted pitot tube is in communication with a respective piezoelectric transducer provided on the outside of the tubular, e.g., clamped or otherwise attached, e.g., mechanically or chemically. The plurality of pitot tubes each in communication with a respective piezoelectric transducer is referred to herein as a "pitot array sensor."

Potting: As used herein, the term "potting" refers to the encapsulation of electrical components with epoxy, elastomeric, silicone, or asphaltic or similar compounds for the purpose of excluding moisture or vapors. Potted components may or may not be hermetically sealed.

Production fluids: As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, carbon dioxide, hydrogen sulfide and water (including steam).

Production optimization: As used herein, the term "production optimization" refers to any method, device, control device, valve, chemical, metrics, data analysis, and/or system that can be used to improve hydrocarbon fluid production efficiency, hydrocarbon fluid production rates, hydrocarbon fluid recovery, produced gas/oil ratio, hydrocarbon fluid phase, utilization of the production plant to achieve higher throughput; water-cut, workovers, etc. Production optimization can be real-time production optimization including partial or complete automation, and/or optimization of control settings. Production optimization can be accomplished, for example, but not limited to, chemically by preventing or inhibiting scale, paraffin, asphaltene, and/or corrosion using inhibitors of one or more thereof; extending field life using for example, defoamers, emulsifiers, foamers, flow improvers, tracer dyes, and/or water clarifiers, acidizing, etc.; reinstating or improving flow performance chemically using, for example, dissolvers, cleaners, scavengers, adsorbents, water flooding, $CO_2$ flooding, etc.; mechanically, for example, but not limited to artificial lift, using, for example, pumps, including but not limited to, electric submersible pumps, gas lift, horizontal surface pumps, subsea lift systems, dewatering pump systems, geothermal pump systems, industrial pump systems, etc.; gas/water injection optimization; tubing size optimization; perforation optimization; nitrogen circulation; and the like. In certain cases, production optimization may include sealing a lost circulation zone.

Production optimization can include, but is not limited to, one or more of the following: equalizing reservoir inflow along a length of the wellbore, partially choking flow, delaying water or gas breakthrough by reducing annular velocity across a selected interval, e.g., such as the heel of a horizontal well, adjusting flow from individual zones of a production well including one or more zones of a multi-zone production well, e.g., that are over- or under-pressured, slowing water and/or gas encroachment, and reducing the amount of bypassed reserves by equalizing a pressure drop along a length of a wellbore, e.g., so as to promote uniform flow of oil and gas through a formation so that the arrivals of water and gas are delayed and simultaneous. Production optimization can be accomplished using, for example, but not limited to, one or more of control devices including for example, ICDs including for example, one or more of passive ICDs, nozzle-based ICDs, orifice ICDs, channel ICDs, helical-channel ICDs, ResFlow ICDs, autonomous ICDs (AICDs), and ICDs that are tube-channel and orifice-nozzle combinations. ICDs suitable for use according to the presently described subject matter can include EQUIFLOW autonomous ICDs (Halliburton ICDs can be used to manage fluid outflow in injection wells. ICDs can be placed both in injection and producer wells; or more remotely actuated downhole valves to shut off or reduce fluid flow from one or more well production zones; outflow control devices, valves and corresponding actuation devices, wellbore isolation devices including for example, tool seals, packers, cement plugs, bridge plugs, chemical control devices, and the like.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc., and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds). In the figures, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

References: In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

Sealing material: As used herein, the term "sealing material" refers to any material that can seal a cover of a housing to a body of a housing sufficient to withstand one or more downhole conditions including but not limited to, for example, temperature, humidity, soil composition, corrosive elements, pH, and pressure.

Sensor: As used herein, the term "sensor" includes any electrical sensing device or gauge. The sensor may be capable of monitoring and/or detecting and/or measuring a fluid flow parameter, including for example, but not limited to pressure, pressure drop, temperature, fluid flow, fluid type, volumetric flow, fluid velocity, vibration, resistivity, impedance, attenuation, or other fluid flow data. Alternatively, the sensor may be a position or location sensor.

Subsurface: As used herein, the term "subsurface" refers to geologic strata occurring below the earth's surface.

Topside communications node: The term "topside communications node" as used herein, refers to a communications node that can be located topside, proximate a surface. The topside communications node can be a virtual topside communications node that can be located subsurface or downhole, and can function as a topside node. The virtual topside communications node can be located, for example, at locations including but not limited to, the bottom of a vertical section, e.g., at the start of a deviated section, for example, in order to communicate with multi-zone horizontal sections of a multi-zone well. Data can be brought to the surface, e.g., to a receiver located at the surface, using, for example, but not limited to, one or more of a wireless connection, e.g., an RF wireless connection, a cable, a fiber optic cable, and the like.

Tubular member: The terms "tubular member" or "tubular body" refer to any pipe, such as a joint of casing, a portion of a liner, a drill string, a production tubing, an injection tubing, a pup joint, a buried pipeline, underwater piping, or above-ground piping. "Tubular body" may also include sand control screens, inflow control devices or valves, sliding sleeve joints, and pre-drilled or slotted liners.

Wellbore: As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

Zone: The terms "zone" or "zone of interest" refer to a portion of a formation containing hydrocarbons. The term "hydrocarbon-bearing formation" may alternatively be used. Zones of interest may also include formations containing brines or useable water which are to be isolated. Solids may also be present.

Description

The inventions are described herein in connection with certain specific embodiments. However, to the extent that the following detailed description is specific to a particular embodiment or a particular use, such is intended to be illustrative only and is not to be construed as limiting the scope of the inventions.

An in-situ system and method for assessing production conditions of a production zone of a production well is provided herein. The system employs a series of communications nodes spaced along a wellbore. Each node transmits a signal that represents a packet of information. The packet of information can include a node identifier, telemetry information, and sensing information conveyed using acoustic waves. The signals are relayed up the wellbore from node-to-node in order to provide a wireless signal to a receiver at the surface indicative of a value of a fluid flow parameter.

The presently described systems and methods can be used to assess zonal fluid flow, and assess production conditions in one or more production zones of a production well, including for example, a multi-zone production well and a multiphase fluid producing multi-zone production well.

The presently described subject matter, in another aspect, provides optimization of production performance to improve production efficiency, output, quality, composition, and the like, in one or more production zones of a multi-zone, multiphase fluid producing well.

The presently described systems and methods are in-situ, and can be performed in real-time or near real time.

System

FIGS. 1A and 2 present illustrative wellbores 150, 250 that may receive a downhole telemetry system using acoustic transducers. In each of FIGS. 1A and 2, the top of the drawing page is intended to be toward the surface and the bottom of the drawing page toward the well bottom. While wells commonly are completed in substantially vertical orientation, it is understood that wells may also be inclined and even horizontally completed. When the descriptive terms "up" and "down" or "upper" and "lower" or similar terms are used in reference to a drawing, they are intended to indicate location on the drawing page, and not necessarily orientation in the ground, as the present inventions have utility no matter how the wellbore is orientated.

FIG. 1A is a side, cross-sectional view of an illustrative well site 100. The well site 100 includes a wellbore 150 extending from the earth surface 101 and down into an earth subsurface 155. The illustrative wellbore 150 is a production well.

The wellbore 150 has been completed with a series of pipe strings, referred to as casing. First, a string of surface casing 110 has been cemented into the formation. Cement is shown in an annular bore 115 of the wellbore 150 around the casing 110. The cement is in the form of an annular sheath 112. The surface casing 110 has an upper end in sealed connection with a lower valve 164.

Next, at least one intermediate string of casing 120 is cemented into the wellbore 150. The intermediate string of casing 120 is in sealed fluid communication with an upper valve 162. A cement sheath 112 is again shown in a bore 115 of the wellbore 150. The combination of the casing 110/120 and the cement sheath 112 in the bore 115 strengthens the wellbore 150 and facilitates the isolation of formations behind the casing 110/120.

It is understood that a wellbore 150 may, and typically will, include more than one string of intermediate casing. In some instances, an intermediate string of casing may be a liner. It is also understood that the upper valve 162 and the lower valve 164 are part of a well head 160, which is schematically shown. The wellhead 160 may include various valves for controlling the flow of fluids into and out of the wellbore 150.

Also, a production string 130 is provided. The production string 130 may be a string of production tubing all the way back to the surface, or for further example a production liner that is not tied back to the surface 101. In the arrangement of FIG. 1A, the production string 130 may be hung from the intermediate casing string 120 using a liner hanger 131, and a cement sheath 132 is provided around the liner 130.

The production string 130 extends into the subsurface formation 155. The production string 130 has a lower end 134 that extends to an end 154 of the wellbore 150. For this reason, the wellbore 150 is said to be completed as a cased-hole well.

The production string 130 has been perforated after cementing. Perforations are shown at 159. The perforations 159 create fluid communication between a bore 135 of the liner 130 and the surrounding rock matrix making up the subsurface formation 155. In one aspect, the production string 130 is not a liner but is a casing string that extends back to the surface.

The wellbore 150 also includes a string of production tubing 140. The production tubing 140 extends from the well head 160 down to the subsurface formation 155. In the arrangement of FIG. 1A, the production tubing 140 terminates proximate the end 154 of the wellbore 150. However, it is understood that the production tubing 140 may terminate anywhere along the subsurface formation 155. In one aspect, more than one string of production tubing 140 may be used, with each string terminating along a different zone.

A production packer 141 can be provided along the production tubing 140. The illustrative packer 141 is placed proximate the top of the subsurface formation 155. In this way, the packer 141 is able to seal off an annular region 145 between the tubing 140 and the surrounding production liner 130.

The wellbore 150 is completed in several different zones. Three illustrative zones are shown at 102, 104, and 106. Perforations 159 are shown at each of these zones.

The well site 100 of FIG. 1A presents a telemetry system that utilizes a series of novel communications nodes 180, 182, 184 placed along the wellbore 150. These nodes 180, 182, 184 allow for the high speed transmission of wireless signals based on the in-situ generation of acoustic waves. The waves represent wave forms that may be processed and analyzed at the surface.

The nodes first include a topside communications node 182. The topside communications node 182 is placed closest to the surface 101. The topside communications node 182 is configured to receive acoustic signals and convert them to electrical or optical signals. The topside communications node 182 may be above grade or below grade. In the arrangement of FIG. 1A, the topside communications node 182 is connected to the well head 160.

In addition, the nodes include a plurality of subsurface communications nodes 180. The subsurface communications nodes 180 are configured to transmit acoustic signals along the length of the wellbore 150 up to the topside communications node 182.

A downhole telemetry system that enables the operator to determine the presence of fluid flow along the different zones 102, 104, 106 may be implemented. This enables the operator to optimize well flow during production or injection operations. To do this, the well site 100 includes a plurality of intermediate communications nodes 180 and one or more sensor communications nodes 184. The communications nodes 180, 184 are placed along the production tubing 140 according to a pre-designated spacing. The communications nodes 180, 184 then send acoustic signals up the wellbore 150 in node-to-node arrangement to a topside communications node 182.

The topside communications node 182 can be the uppermost intermediate communications node. The topside communications node 182 can be placed closest to the surface 101. The topside communications node 182 is configured to receive acoustic signals and convert them to electrical or optical signals. The topside communications node 182 may be above grade or below grade. In the arrangement of FIG. 1A, the topside communications node 182 is connected to the wellhead 160. Alternatively, the topside communications node 182 can be a virtual topside communications node located subsurface or downhole, for example, such locations can include but are not limited to, at the top of a deviated section, proximate a multi-zone horizontal completion, and the like. The virtual topside communications node can transmit data to the surface, e.g., to a receiver at the surface, for example, by one or more of a wireless connection, an RF wireless connection, a cable, a fiber optic cable, and the like, according to the presently described subject matter.

The well site 100 of FIG. 1A also shows a receiver 170. The receiver 170 comprises a processor 172 that receives signals sent from the topside communications node 182. The signals may be received through a wire (not shown) such as a co-axial cable, a fiber optic cable, a USB cable, or an electrical conduit or optical communications wire. Alternatively, the receiver 170 may receive the signals from the topside communications node 182 wirelessly through a modem, a transceiver or other wireless communications link such as Bluetooth or Wi-Fi. The receiver 170 preferably receives electrical signals via a so-called Class I, Division I conduit, that is, a housing for wiring that is considered acceptably safe in an explosive environment. In some applications, radio, infrared or microwave signals may be utilized.

The processor 172 may include discreet logic, any of various integrated circuit logic types, or a microprocessor. In any event, the processor 172 may be incorporated into a computer having a screen. The computer may have a separate keyboard 174, as is typical for a desk-top computer, or an integral keyboard as is typical for a laptop or a personal digital assistant. In one aspect, the processor 172 is part of a multi-purpose "smart phone" having specific "apps" and wireless connectivity.

The downhole telemetry system also includes sensor communications nodes 184. The sensor communications nodes 184 are in electrical communication with a sensor. Selected subsurface communications nodes can house a sensor, and serve as sensor communications nodes 184. The sensors can include fluid flow measurement devices. The sensor may also include fluid identification sensors and/or temperature sensors.

FIG. 1B provides an enlarged cross-sectional view of a portion of the illustrative wellbore 150 of FIG. 1A. Here, production zone 104 from the subsurface formation 155 is seen in an expanded view. A sensor communications node 184 shown along the production tubing 140. Production fluids, indicated by arrow "P," indicates the flow of fluids into the production tubing 140 through an inflow control device 190.

Two sensors are shown schematically along the inflow control device 190. A first sensor 186 is a fluid measurement device. This device 186 detects the flow of fluid through the inflow control device 190. The fluid measurement device 186 can also measures volume of fluid flow there through. Downhole flow measurement devices are configured for interfacing with a sensor communications node 184. Alternatively, a sensor can be housed within the sensor communications node.

The second sensor 188 may be a fluid identification sensor. This sensor 188 may use optometrics or other technology known in the industry to identify a fluid type at the level of the inflow control device 190.

Each sensor 186, 188 is associated with the sensor communications node 184. Alternatively, the sensor may be housed within the sensor communications node.

The communications node 184 is in electrical communication with a sensor, e.g., sensor 188. The sensor 188 can measure a fluid flow parameter. Sensors, for example sensor 188 in the wellbore 150 may include, but are not limited to any of: (i) fluid velocity measurement devices residing inside of the production tubing 140 (such as an axial turbine flow meter, referred to as a "spinner" on production logging tools, where the speed of the rotating spinner is proportional to the fluid velocity); (ii) temperature sensors that measure temperature of fluids flowing inside of the production tubing; (iii) pressure sensors that measure pressure inside of the production tubing, or pressure drop across a gas lift valve; (iv) fluid density sensors that measure the density of fluids inside of the production tubing; (v) microphones that provide passive acoustic monitoring to listen for the sound of gas entry into the production tubing or the opening and closing of the gas lift valve; (vi) piezoelectric transducers; (vii) ultrasound sensors that correlate changes in gas transmission with gas flows, bubbles, solids and other properties of flow along gas inlets; (viii) Doppler shift sensors; (ix) chemical sensors; ix) an imaging device; or (xi) combinations thereof.

A piezoelectric transducer or similar device capable of measuring sound may be clamped onto the outside of production tubing, or the transducer may be housed within the sensor communications node. The properties of the sound waves emitted by flowing fluid can be correlated to the flow rate.

As another option, an ultrasonic flow meter may be clamped onto the outside of production tubing. Alternatively, the meter may be fabricated with threaded ends so that production tubing joints can be screwed into it.

A laser optical flow meter may be used to measure fluid flow. Here, two laser beams are focused a short distance apart in the production tubing flow path. Small solid particles being carried by the fluid that cross the laser beams will scatter the light. A photodetector collects the scattered light. The fluid velocity can be determined based on the time between when the particles scatter the first and second light beams.

Another device is the acoustic Doppler velocimetry tool. Here, the speed of a particle carried by the fluid is measured based on the acoustic Doppler shift effect. Still another device is the Coriolis flow meter. This device relies upon a vibrating tube which would be mounted inside the production tubing.

Yet another fluid measurement device is the thermal mass flow meter. This device uses a heating element that is attached to either the outside or the inside of the production tubing. Temperature sensors are attached on either side of the heating element. The temperature differential between the temperature sensors depends upon the flow rate of the fluid. Velocity can be determined if the specific heat and density of the flowing fluid are known along with the measured $\Delta T$.

Other flow measurement devices which use the principles of a Venturi nozzle may be used. Pressure sensors are used to record the differential pressure on either side of a nozzle or other constriction in the tubing. An example is a V-Cone flow meter or Venturi meter. Alternatively, a pitot tube mounted or extended into the production tubing may be used. Pitot tube sensors, such as orifice plates, flow nozzle or Venturi tubes are classified as flow measuring devices which utilize differential pressure to measure volumetric flow.

In this respect, each sensor 186, 188 sends electrical signals that are indicative of the value of a fluid flow parameter in the wellbore 150. The electrical signal is delivered to the sensor communications node 184. An electro-acoustic transducer within the sensor communications node 184 then converts that signal into an acoustic signal. The acoustic signal is then transmitted to a next communications node 180 along the production tubing 140.

The acoustic signal represents a packet of data. The packet of data will first include an identifier for the sensor communications node 184 that originally transmitted the signal. The packet of data will also include a waveform indicative of the sensor readings from the sensors 186, 188. The sensor communications node 184 may optionally house a temperature sensor. In this way, the waveform would also be indicative of temperature readings at the depth of the sensor communications node 184.

It is noted that the operator will maintain a wellbore diagram that generally informs as to where the various sensor communications nodes are located. In addition, the processor 172 may be programmed to associate the identification of the sensor communications node 184 transmitting a signal with the depth of the sensor reading(s). This is referred to in the telemetry industry as an address.

FIGS. 1A and 1B demonstrate the use of a wireless data telemetry system where communications nodes are placed along a string of tubing. The illustrative wellbore 150 is completed vertically. However, the wireless downhole telemetry system may also be employed in wells that are deviated or that are horizontally completed. Further, the telemetry system may employ nodes along the casing string of a wellbore.

FIG. 2 is a cross-sectional view of an illustrative well site 200. The well site 200 includes a wellbore 250 that penetrates into a subsurface formation 255. The wellbore 250 has been completed as a cased-hole completion for producing hydrocarbon fluids. The well site 200 also includes a well head 260. The well head 260 is positioned at an earth surface 201 to control and direct the flow of formation fluids from the subsurface formation 255 to the surface 201. Perforations are shown at 208.

The wellbore 250 has been completed horizontally using directional drilling. There are several advantages to directional drilling. These primarily include the ability to complete a wellbore along a substantially horizontal axis of a subsurface formation, thereby exposing a greater formation face. These also include the ability to penetrate into subsurface formations that are not located directly below the well head 260. This is particularly beneficial where an oil reservoir is located under an urban area or under a large body of water. Another benefit of directional drilling is the ability to group multiple well heads on a single platform, such as for offshore drilling. Finally, directional drilling enables multiple laterals and/or sidetracks to be drilled from a single wellbore in order to maximize reservoir exposure and recovery of hydrocarbons.

Referring first to the well head 260, the well head 260 may be any arrangement of pipes or valves that receive reservoir fluids at the top of the well. In the arrangement of FIG. 2, the well head 260 represents a so-called Christmas tree. A Christmas tree is typically used when the subsurface formation 255 has enough in-situ pressure to drive production fluids from the formation 255, up the wellbore 250, and to the surface 201. The illustrative well head 260 includes a top valve 262 and a bottom valve 264.

It is understood that rather than using a Christmas tree, the well head 260 may alternatively include a motor (or prime mover) at the surface 201 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 260 may be configured to support a string of production tubing having a downhole electric submersible pump, a gas lift valve, or other means of artificial lift (not shown). The present inventions are not limited by the configuration of production equipment at the surface unless expressly noted in the claims.

Referring next to the wellbore 250, the wellbore 250 has been completed with a series of pipe strings referred to as casing. The casing is generally similar to that provided in the wellbore of FIG. 1A. In this respect, a surface casing 210, one or more strings of intermediate casing 220, and a production casing 230 are provided. The casing strings 210, 220, 230 are fixed in the wellbore by a cement sheath 212/232 residing within an annular region 215.

The surface casing 210 has an upper end in sealed connection with the lower valve 264. Similarly, the intermediate string of casing 220 is in sealed fluid communication with the upper valve 262. The production string 230 has a lower end 234 that extends to an end 254 of the wellbore 250. For this reason, the wellbore 250 is said to be completed as a cased-hole well. Those of ordinary skill in the art will understand that for production purposes, the liner 230 may be perforated after cementing to create fluid communication between a bore 235 of the liner 230 and the surrounding rock matrix making up the subsurface formation 255. In one aspect, the production string 230 is not a liner but is a casing string that extends back to the surface.

As an alternative, end 254 of the wellbore 250 may include joints of sand screen (not shown). The use of sand screens with gravel packs allows for greater fluid communication between the bore 235 of the liner 230 and the surrounding rock matrix while still providing support for the wellbore 250. In this instance, the wellbore 250 would include a slotted base pipe as part of the sand screen joints. Of course, the sand screen joints would not be cemented into place and would not include subsurface communications nodes.

The wellbore 250 optionally also includes a string of production tubing 240. The production tubing 240 extends from the well head 260 down to the subsurface formation 255. In the arrangement of FIG. 2, the production tubing 240 terminates proximate an upper end of the subsurface formation 255. A production packer 241 may also be provided at a lower end of the production tubing 240 to seal off an annular region 245 between the tubing 240 and the surrounding production liner 230. However, the production tubing 240 may extend closer to the end 234 of the liner 230.

The wellbore 250 may optionally include one or more gas lift valves. The gas lift valves can reside along the production tubing 240 above the packer. The gas lift valves receive gas injected into the annulus 245 between the production tubing 240 and the surrounding casing 230. The gas lift valves can then inject that gas into a bore of the production tubing 240 for the purpose of reducing the density of the wellbore fluids.

In order to inject the gas, a gas injection line may be provided along the wellhead 260. The wellhead 260 includes a gauge and a pressure regulator. Typically, the gas that is injected is separated gas that has been produced from the subsurface formation 255. A gas compressor may be located at the surface 201 near the well site 200 pressurizes gas that is communicated to the annulus 245 of the wellbore 250.

The wellbore 250 is completed in several different zones. Three illustrative zones are shown at 202, 204, and 206. Perforations 259 are shown at each of these zones.

In some completions a production tubing 240 is not employed. This may occur, for example, when a monobore is in place.

It is also noted that the bottom end 234 of the production string 230 is completed substantially horizontally within the subsurface formation 255. This is a common orientation for wells that are completed in so-called "tight" or "unconventional" formations. Horizontal completions not only dramatically increase exposure of the wellbore to the producing rock face, but also enable the operator to create fractures that are substantially transverse to the direction of the wellbore. However, the presently described subject matter has equal utility in vertically completed wells or in multi-lateral deviated wells.

As with the well site 100 of FIG. 1, the well site 200 of FIG. 2 includes a telemetry system that utilizes a series of novel communications nodes. Here, communications nodes 280, 282, 284 are placed along the outer diameter of the casing strings 210, 220, 230. These nodes allow for the high speed transmission of wireless signals based on the in-situ generation of acoustic waves.

The nodes first include a topside communications node 282. The topside communications node 282 is placed closest to the surface 201. The topside node 282 is configured to receive acoustic signals. In the arrangement of FIG. 2, the topside communications node 282 is attached to a top casing joint within the wellbore 250. However, the topside communications node 282 may be attached to the well head 260. Either arrangement is considered to be "along the wellbore."

In addition, the nodes include a plurality of subsurface communications nodes 280. Each of the subsurface communications nodes 280 is configured to receive and then relay acoustic signals along essentially the length of the wellbore 250. The subsurface communications nodes 280 may utilize electro-acoustic transceivers to receive and relay mechanical, e.g., acoustic waves.

The subsurface communications nodes 280 transmit signals as acoustic waves. The acoustic waves are preferably at a frequency of from about 50 kHz to about 500 kHz, from about 50 kHz to about 300 kHz, from about 60 kHz to about 200 kHz, from about 65 kHz to about 175 kHz, from about 70 kHz to about 160 kHz, from about 75 kHz to about 150 kHz, from about 80 kHz to about 140 kHz, from about 85 kHz to about 135 kHz, from about 90 kHz to about 130 kHz, or from about 100 kHz to about 125 kHz. The signals are delivered up to the topside communications node 282, in node-to-node arrangement.

The signals originate with sensors located along the wellbore 250. The sensors can include any sensor that measures a fluid or multiphase fluid parameter. The sensor may be, for example, a fluid measurement device 186 that can include, but is not limited to a flow probe, and the fluid identification sensor 188 that can include but is not limited to a material probe, shown in FIG. 1B. These sensors are associated with a sensor communications node 284. The sensors may be separate from the sensor communication node as shown, or may be housed within the housing of the sensor communications node. Alternatively or in addition, the sensor may be a temperature sensor residing within or adjacent to a sensor communications node 284. As described above, an electro-acoustic transducer within the sensor communications node 284 converts the signals from the sensors into an acoustic signal. The acoustic signal is then transmitted to a next communications node 280 along the production tubing 240 by means of a transceiver within the sensor communications node 284.

The acoustic signal represents a packet of data. The packet of data will first include an identifier for the sensor communications node 284 that originally transmitted the signal. The packet of data will also include a waveform indicative of the sensor readings from the sensors.

The well site 200 of FIG. 2 shows a receiver 270. The receiver 270 comprises a processor 272 that receives signals sent from the topside communications node 284. The processor 272 may include discreet logic, any of various integrated circuit logic types, or a microprocessor. The receiver 270 may include a screen and a keyboard 274 (either as a keypad or as part of a touch screen). The receiver 270 may also be an embedded controller with neither a screen nor a keyboard which communicates with a remote computer via cellular modem or telephone lines.

The signals may be received by the processor 272 through a wire (not shown) such as a co-axial cable, a fiber optic cable, a USB cable, or other electrical or optical communications wire. Alternatively, the receiver 270 may receive the final signals from the topside node 282 wirelessly through a modem or transceiver. The receiver 270 may receive electrical signals via a so-called Class I, Div. 1 conduit, that is, a wiring system or circuitry that is considered acceptably safe in an explosive environment.

In each of FIGS. 1A and 2, the communications nodes 180, 280 are specially designed to withstand the same corrosion and environmental conditions (high temperature, high pressure) of a wellbore 150 or 250 as the casing, drill string, or production tubing. To do so, the communications nodes 180, 280 may include steel housings for holding the electronics. In one aspect, the steel material is a corrosion resistant alloy. Suitable communications nodes and housings include those described in U.S. Patent Publication No. 2015/0354351 incorporated herein by reference in its entirety, as well as those described in and as described herein.

In FIG. 1A, the intermediate communications nodes 180 are shown schematically. However, FIG. 3 offers an enlarged perspective view of an illustrative pipe joint 300, along with a communications node 350. The illustrative communications node 350 is shown exploded away from the pipe joint 300.

In FIG. 3, the illustrated pipe joint 300 is intended to represent a joint of casing. However, the pipe joint 300 may be any other tubular body such as a joint of tubing, drill pipe, or a pipeline. The pipe joint 300 has an elongated wall 310 defining an internal bore 315. The bore 315 transmits drilling fluids such as an oil based mud, or OBM, during a drilling operation. The bore 315 also receives a string of tubing (such as production tubing or injection tubing, not shown), once a wellbore is completed.

The illustrated pipe joint 300 has a box end 322 having internal threads, such a through use is a threaded connector collar or with an integrated threaded box joint. In addition, the pipe joint 300 has a pin end 324 having external threads. The threads may be of any design. Tubing joints and casing joints have a slightly different general end appearance than the illustrated drill pipe joint, but these are also tubular bodies that may be equipped similar to the illustrated drill pipe joint 300.

As noted, an illustrative exemplary communications node 350 is shown for illustration purposes, exploded away from the pipe joint 300. The exemplary communications node 350 is designed to attach to a wall 310 of the pipe joint 300 at a selected location. In one aspect, each pipe joint 300 will have a communications node 350 between the box end 322 and the pin end 324. In one arrangement, the communications node 350 is placed immediately adjacent the box end 322 or, alternatively, immediately adjacent the pin end 324 of every joint of pipe. In another arrangement, the communications node 350 is placed at a selected location along every second or every third pipe joint 300 in a drill string. In still another arrangement, at least some pipe joints 300 receive two communications nodes 350.

The communications node 350 shown in FIG. 3 is designed to be pre-welded onto the wall 310 of the pipe joint 300. Alternatively, the communications node 350 may be glued using an adhesive such as epoxy. The communications node 350 may be configured to be selectively attachable to/detachable from a pipe joint 300 by mechanical means at a well site. This may be done, for example, through the use of clamps. In any instance, the communications node 350 is an independent wireless communications device that is designed to be attached to an external surface of a well pipe.

There are benefits to the use of an externally-placed communications node that uses acoustic waves. For example, such a node will not interfere with the flow of fluids within the internal bore 315 of the pipe joint 300 or decrease the effective inner diameter which would interfere with passing subsequent assemblies or tubulars through. Further, installation and mechanical attachment can be readily assessed and adjusted.

In FIG. 3, the communications node 350 includes an elongated body 351. The body 351 supports one or more batteries, shown schematically at 352. The body 351 also supports an electro-acoustic transducer, shown schematically at 354. The electro-acoustic transducer 354 is associated with a transceiver that transmits acoustic signals to a next communications node.

The communications node 350 may represent the communications nodes 180 of FIG. 1A, in one aspect. The electro-acoustic transducer 354 in each node 180 allows signals to be sent from node-to-node, up the wellbore 150, as acoustic waves. The acoustic waves may be at a frequency of, for example, from about 50 kHz to about 500 kHz, from about 50 kHz to about 300 kHz, from about 60 kHz to about 200 kHz, from about 65 kHz to about 175 kHz, from about 70 kHz to about 160 kHz, from about 75 kHz to about 150 kHz, from about 80 kHz to about 140 kHz, from about 85 kHz to about 135 kHz, from about 90 kHz to about 130 kHz, or from about 100 kHz to about 125 kHz. A last subsurface communications node 180 transmits the signals to the topside node 182. The topside communications node 182 can be a virtual topside communications node located subsurface or downhole, according to the presently described subject matter. The subsurface communications nodes 180 may not require a wire or cable to transmit data to the surface. The communication may be routed around nodes which are not functioning properly.

FIG. 4A is a perspective view of a communications node 400 as may be used in the wireless data transmission systems of FIG. 1A, or FIG. 2 (or other wellbore), in one embodiment. The communications node 400 is designed to provide data communication using a transceiver within a novel downhole housing assembly. FIG. 4B is a cross-sectional view of the communications node 400 of FIG. 4A. The view is taken along the longitudinal axis of the node 400. The communications node 400 will be discussed with reference to FIGS. 4A through 4C, together.

The communications node 400 first includes a fluid-sealed housing 410. The housing 410 is designed to be attached to an outer wall of a joint of wellbore pipe, such as the pipe joint 300 of FIG. 3. Where the wellbore pipe is a carbon steel pipe joint such as drill pipe, casing or liner, the housing 410 can be fabricated from carbon steel. This metallurgical match avoids galvanic corrosion at the coupling.

The housing 410 includes an outer wall 412. The wall 412 is dimensioned to protect internal electronics for the communications node 400 from wellbore fluids and pressure. In one aspect, the wall 412 is about 0.2 inches (0.51 cm) in thickness. The housing 410 optionally also has a protective outer layer 425. The protective outer layer 425 resides external to the wall 412 and provides an additional thin layer of protection for the electronics.

A bore 405 is formed within the wall 412. The bore 405 houses the electronics, shown in FIG. 4B as a battery 430, a power supply wire 435, a transceiver 440, and a circuit board 445. The circuit board 445 will preferably include a micro-processor or control logic associated with the transceiver 440 for digitizing acoustic signals. An electro-acoustic transducer 442 is provided to convert acoustical energy to electrical energy (or vice-versa) and is coupled with outer wall 412 on the side attached to the tubular body. The transducer 442 is in electrical communication with a sensor 432.

It is noted that in FIG. 4B, the sensor 432 resides within the housing 410 of the communications node 400. However, as noted, the sensor 432 may reside external to the communications node 400, such as above or below the node 400 along the wellbore. In FIG. 4C, a dashed line is provided showing an extended connection between the sensor 432 and the electro-acoustic transducer 442.

The transceiver 440 will receive an acoustic telemetry signal. In one preferred embodiment, the acoustic telemetry data transfer is accomplished using multiple frequency shift keying (MFSK). Any extraneous noise in the signal is moderated by using well-known conventional analog and/or digital signal processing methods. This noise removal and signal enhancement may involve conveying the acoustic signal through a signal conditioning circuit using, for example, a bandpass filter.

The transceiver will also produce acoustic telemetry signals. In one aspect, an electrical signal is delivered to an electromechanical transducer, such as through a driver circuit. In a preferred embodiment, the transducer is the same electro-acoustic transducer that originally received the MFSK data. The signal generated by the electro-acoustic transducer then passes through the housing 410 to the tubular body (such as production tubing 240), and propagates along the tubular body to other communication nodes. The re-transmitted signal represents the same sensor data originally transmitted by sensor communications node 284. In one aspect, the acoustic signal is generated and received by a magnetostrictive transducer comprising a coil wrapped around a core as the transceiver. In another aspect, the acoustic signal is generated and received by a piezoelectric ceramic transducer. In either case, the electrically encoded data are transformed into a sonic wave that is carried through the wall of the tubular body in the wellbore.

Each transceiver 440 is associated with a specific joint of pipe. That joint of pipe, in turn, has a known location or depth along the wellbore. The acoustic wave as originally transmitted from the transceiver 440 will represent a packet of information. The packet will include an identification code that tells a receiver (such as receiver 270 in FIG. 2) where the signal originated, that is, which communications node 400 it came from. In addition, the packet will include an amplitude value originally recorded by the communications node 400 for its associated joint of pipe.

When the signal reaches the receiver at the surface, the signal is processed. This involves identifying which communications node the signal originated from, and then determining the location of that communications node along the wellbore. This may further involve comparing the original amplitude value with a baseline value. The baseline value represents an anticipated temperature indicative of the presence of a wellbore fluid.

The communications node 400 optionally also includes one or more sensors 432. The sensors 432 may be, for example, pressure sensors, temperature sensors, acoustic/sound/seismic sensors, fluid identification sensor, or fluid flow measurement sensors. The sensor 432 sends signals to the transceiver 440 through a short electrical wire 435 or through the printed circuit board 445. Signals from the sensor 432 are converted into acoustic signals that are sent by the transceiver 440 as part of the packet of information.

In one aspect, the sensors measure or are used to infer fluid composition along a wellbore. These sensors may be, for example, (i) temperature sensors, (ii) fluid identification sensors, (iii) amp meters or volt meters that measure an electrical current that is passed along a body of a subsurface communications node, (iv) an electrical device that measures a capacitance of fluid, (v) a microphone, (vi) a device for measuring fluid density, (vii) impedance sensors, and (viii) a device for measuring rheology of fluid density in proximity to a corresponding subsurface communications node. In this instance, the subsurface communications nodes are configured to receive and relay acoustic signals indicative of readings taken by the fluid composition sensors up to the surface.

The communications node 400 also optionally includes a shoe 490. More specifically, the node 400 includes a pair of shoes 490 disposed at opposing ends of the wall 412. Each of the shoes 490 provides a beveled face that helps prevent the node 400 from hanging up on an external tubular body or the surrounding earth formation, as the case may be, during run-in or pull-out. The shoes 490 may have a protective outer layer 422 and an optional cushioning material 424 under the outer layer 422.

FIG. 5A is a side view of an illustrative, nonexclusive example of a communications node 500 as may be used in the wireless data transmission systems of FIG. 1 or 2 (or other wellbore), in one aspect. The communications node 500 may he an intermediate communications node that is designed to provide two-way communication using a transceiver within a novel downhole housing assembly. Communications node 500 includes body 510 and a cover 520. The body 510 includes an interior portion configured to receive an electrical component, and has a body length, a body width, and a body depth. The body 510 also includes a first chamfered perimeter (not shown) defining an open top portion. The body 510 includes a pair of opposing lengthwise tabs 511 each extending from a linear end of the body 512 adjacent to the open top portion, each of the lengthwise tabs 511 having a tab length, a tab thickness less than the depth of the body, a tab terminal end 513, and a first tab surface 514 and an opposing second tab surface 515. The lengthwise tabs may further comprise a tab terminal projection 516 extending from the first tab surface 514 at the terminal end 513.

Cover 520 of FIG. 5A has a cover length, a cover width, and a cover thickness, the cover being configured to cover the open top portion of body 510 and enclose the interior portion of body 510. The cover 520 includes a first surface 522 and an opposing second surface 524. The first surface 522 can comprise a second chamfered perimeter (not shown) configured to sealingly engage with the first chamfered perimeter of body 510.

The opposing second surface 524 of cover 520 can include at least one integral engagement portion 526 projecting from the opposing second surface and having an engagement surface and an engagement length where the engagement length is less than or equal to a cover length. For example, the engagement length of each at least one integral engagement portions 526 can be equal to or substantially equal to the cover length, or can be from about 2% to about 98%. from about 5% to about 90%, from about 10% to about 80%, from about 15% to about 75%, from about 20% to about 70%, from about 25% to about 65%, from about 30% to about 60%, from about 35% to about 55%, from about 40% to about 50%, from about 2% to about 35%, from about 4% to about 30%, from about 6% to about 25%, from about 7% to about 20%, from about 8% to about 15%, about 9%, about 10%, about 11%, about 12%, about 13%, about 14%, or about 15% of the cover length. The engagement length of each of two or more engagement portions 526, can be the same or different. When communications node 500 is attached to an outer surface of a tubular, only engagement surface 530 of the at least one integral engagement portion 520 is in contact with the outer surface of the tubular. The entire engagement surface 530 or a portion of the engagement surface 530 may be in contact with an outer surface of the tubular.

The body 510 and the cover 520 including one or more electrical components, are sealed via the second chamfered perimeter of the cover 520 configured to sealingly engage with the first chamfered perimeter of body 510 and a sealing material for sealing the cover to the body via said first chamfered perimeter and the second chamfered perimeter. The sealing material can be a chemical bonding material, for example, including but not limited to, an epoxy. The first chamfered perimeter and the second chamfered perimeter can be of any configuration and can include a configuration that upon engagement with each other, a space is created defined by the first chamfered perimeter and the second chamfered perimeter, whereby upon sealing with a sealing material, the sealing material fills the space resulting in an improved seal.

FIG. 5B is a side view of another illustrative, nonexclusive example of a communications node, i.e., communications node 500' including body 510' and a cover 520'. Cover 520' includes a single integral engagement portion 526' having an engagement length that is substantially equal to or equal to the cover length. When communications node 500' is attached to an outer surface of a tubular, only engagement surface 530' of the single integral engagement portion 526' is in contact with the outer surface of the tubular. The entire engagement surface 530' or a portion of the engagement surface 530' may be in contact with an outer surface of the tubular.

FIG. 6 is a perspective view of an illustrative, nonexclusive example of a communications node, i.e., communications node 600 before the body 610 and the cover 620 are sealed together using, for example a chemical bonding material, including for example, an epoxy, Communications node 600 includes body 610 and cover 620. Body 610 includes an interior portion 616 configured to receive an electrical component, and has a body length, a. body width, and a body depth. The body 610 also includes a first chamfered perimeter 617 defining an open top portion 618. The body 610 includes a pair of opposing lengthwise tabs 611 each extending from a linear end 612 of the body 610 adjacent to the open top portion 618, each of the lengthwise tabs 611 having a tab length, a tab thickness less than the depth of the body, a tab terminal end 613, and a first tab surface 614 and an opposing second tab surface 615. The opposing second tab surface 615 is a radiused tab surface along the tab length, where the curve can be selected to conform to a diameter of a particular tubular to which communications node 600 will be attached. The lengthwise tabs 611 may further comprise a tab terminal projection extending from the first tab surface 614 at the terminal end 613 and a recessed portion (not shown).

Cover 620 has a cover length, a cover width, and a cover thickness, the cover 620 being configured to cover the open top portion 618 of body 610 and enclose the interior portion 616 of body 610. The cover 620 includes a first surface and an opposing second surface. The first surface can comprise a second chamfered 623 perimeter configured to sealingly engage with the first chamfered perimeter 617 of body 610.

The body 610 and the cover 620 including one or more electrical components, are sealed via the second chamfered perimeter 623 of the cover 620 configured to sealingly engage with the first chamfered perimeter 617 of body 610 and a sealing material for sealing the cover to the body via said first chamfered perimeter 617 and the second chamfered perimeter 623. The sealing material can be a chemical bonding material, including but not limited to, an epoxy.

Cover 620 illustrated in FIG. 6 includes electrical components including battery pack 619*a*, circuit board 619*b*, and 2 piezo assemblies 619*c*. The battery pack can include but is not limited to, two (2) 3-cell battery packs, for example, lithium battery packs. The batteries and the circuit board can he potted as one unit, and the Piezos can have their own mechanical clamping and potting.

FIG. 7A is a perspective partial view of an illustrative, nonexclusive example of a communications node 700 including body 710 and cover 720. Body 710 includes lengthwise tab 711 extending from a linear end 712 of the body 710, the lengthwise tabs 711 having a tab length, a tab thickness less than the depth of the body, a tab terminal end 713, and a first tab surface 714 and an opposing second tab surface 715. The lengthwise tab further includes a tab terminal projection 716 extending from the first tab surface 714 at the terminal end 713. The body 710 and the cover 720 together defining shoulder 728.

Cover 720 has a cover length, a cover width, and a cover thickness, the cover 720 being configured to cover the open top portion of body 710 and enclose the interior portion of body 710. The cover 720 includes a first surface not shown) and an opposing second surface 724. The first surface can comprise a second chamfered perimeter configured to sealingly engage with the first chamfered perimeter of body 710. The opposing second surface 724 of cover 720 can include at least one integral engagement portion 726 projecting from the opposing second surface and having an engagement surface 730 and an engagement length When a sealed communications node including body 710 and cover 720 is attached to an outer surface of a tubular, only engagement surface 730 of the at least one integral engagement portion 720 is in contact with the outer surface of the tubular. The entire engagement surface 730 or a portion of the engagement surface 730 may be in contact with an outer surface of the tubular. The engagement surface 730 is a radiused engagement surface along the engagement length, where the curve can be selected to conform to a diameter of a particular tubular to which a sealed communications node including body 710, cover 720, and electrical components, will be attached. Alternatively, engagement surface 730 may be a V-configuration engagement surface formed by an obtuse angle, the V-configuration engagement surface provided along the engagement length, FIG. 7B is a perspective partial view of an illustrative, nonexclusive example of a body 710 of a housing. Body 710 includes lengthwise tab 711 extending from a linear end 712 of the body 710, the lengthwise tabs 711 having a tab length, a tab thickness less than the depth of the body, a tab terminal end 713, and a first tab surface 714 and an opposing second tab surface 715. The lengthwise tab further includes a tab terminal projection 716 extending from the first tab surface 714 at the terminal end 713.

FIG. 7C is a partial bottom view of an illustrative, nonexclusive example of a cover 720 of a housing. Cover 720 has a cover length, a cover width, and a cover thickness, the cover 720 being configured to cover the open top portion of body 710 and enclose the interior portion of body 710. The cover 720 includes a first surface (not shown) and an opposing second surface 724. The first surface can comprise a second chamfered perimeter configured to sealingly engage with the first chamfered perimeter of body 710. The opposing second surface 724 of cover 720 can include at least one integral engagement portion 726 projecting from the opposing second surface and having an engagement surface 730 and an engagement length When a sealed communications node including body 710 and cover 720 is attached to an outer surface of a tubular, only engagement surface 730 of the at least one integral engagement portion 720 is in contact with the outer surface of the tubular. The entire engagement surface 730 or a portion of the engagement surface 730 may be in contact with an outer surface of the tubular. The engagement surface 730 is a radiused engagement surface along the engagement length, where the curve can be selected to conform to a diameter of a particular tubular to which a sealed communications node including body 710, cover 720, and electrical components, will be attached. Alternatively, engagement surface 730 may be a V-configuration engagement surface formed by an obtuse angle, the V-configuration engagement surface provided along the engagement length.

The body 710 and the cover 720 including one or more electrical components, are sealed via the second chamfered perimeter of the cover 720 configured to sealingly engage with the first chamfered perimeter of body 710 and a sealing material for sealing the cover to the body via said first chamfered perimeter and the second chamfered perimeter. The sealing material can be a chemical bonding material, including but not limited to, an epoxy.

FIG. 7D is a perspective partial bottom view of an illustrative, nonexclusive example of communications node 700 including body 710 and cover 720. Body 710 includes lengthwise tab 711 extending from a linear end 712 of the body 710, the lengthwise tabs 711 having a tab length, a tab thickness less than the depth of the body, a tab terminal end 713, and a first tab surface 714 and an opposing second tab surface 715. The lengthwise tab further includes a tab terminal projection 716 extending from the first tab surface 714 at the terminal end 713. The body 710 and the cover 720 together defining shoulder 728.

Cover 720 has a cover length, a cover width, and a cover thickness, the cover 720 being configured to cover the open top portion of body 710 and enclose the interior portion of body 710. The cover 720 includes a first surface and an opposing second surface 724. The first surface can comprise a second chamfered perimeter configured to sealingly engage with the first chamfered perimeter of body 710. The opposing second surface 724 of cover 720 can include art least one integral engagement portion 726 projecting from the opposing second surface and having an engagement surface 730 and an engagement length When sealed communications node 700 is attached to an outer surface of a tubular, only engagement surface 730 of the at least one integral engagement portion 720 is in contact with the outer surface of the tubular. That is, the opposing second tab surface 715 is not in contact with the outer surface of the tubular. The entire engagement surface 730 or a portion of the engagement surface 730 may be in contact with an outer surface of the tubular. Both the engagement surface 730 and the opposing second tab surface 715 are radiused engagement surfaces provided along the engagement length, and the tab length, respectively, where the curve can be selected to conform to a diameter of a particular tubular to which a sealed communications node including body 710, cover 720, and electrical components, will be attached. Alternatively, engagement surface 730 and/or opposing second tab surface 715 may be a V-configuration engagement surface and/or V-configuration opposing second tab surface formed by an obtuse angle, the V-configuration surface provided along the engagement length and/or the tab length.

FIG. 8A is a side view of body 810 including an interior portion 819 configured to receive an electrical component, and has a body length, a body width, and a body depth. The body 810 also includes a first chamfered perimeter 817 defining an open top portion 818. The body 810 includes a pair of opposing lengthwise tabs 811 each extending from a linear end 812 of the body 810 adjacent to the open top portion 818, each of the lengthwise tabs 811 having a tab length, a tab thickness less than the depth of the body, a tab terminal end 813, and a first tab surface 814 and an opposing second tab surface 815. The lengthwise tabs may further comprise a tab terminal projection 816 extending from the first tab surface 814 at the terminal end 813 and a recessed portion 814a.

FIG. 8B is a bottom view of body 810 including an interior portion 819 configured to receive an electrical component, and has a body length, a body width, and a body depth. The body 810 also includes a first chamfered perimeter 817 defining an open top portion. The body 810 includes a pair of opposing lengthwise tabs 811 each extending from a linear end 812 of the body 810 adjacent to the open top portion, each of the lengthwise tabs 811 having a tab length, a tab thickness less than the depth of the body, a tab terminal end 813, and a first tab surface and an opposing second tab surface 815. The lengthwise tabs may further comprise a tab terminal projection extending from the first tab surface at the terminal end 813 and a recessed portion 814a.

In FIGS. 8A and 8B, the opposing second tab surface 815 comprises a V-configuration tab surface formed by an obtuse angle, the V-configuration tab surface provided along the tab length. The obtuse angle can be selected in accordance with an obtuse angle of a V-configuration engagement surface of an integral engagement portion of a cover 820 in order to accommodate a particular range of tubular diameters. Suitable obtuse angles are described herein.

FIG. 8C is a top down view of cover 820 that has a cover length, a cover width, and a cover thickness, the cover being configured to cover the open top portion 818 of body 810 and enclose the interior portion 819 of body 810. The cover 820 includes a first surface comprising a second chamfered perimeter 823 configured to sealingly engage with the first chamfered perimeter 817 of body 810. Cover 820 includes a single continuous integral engagement portion 826 (FIG. 8D) having an engagement length that is equal to or substantially equal to the cover length, an engagement thickness, and an engagement surface opposite the first surface of the cover, the engagement surface being a V-configuration engagement surface formed by an obtuse angle, the V-configuration engagement surface provided along the engagement length and the obtuse angle is selected to accommodate a particular range of tubular diameters. Suitable obtuse angles are described herein.

FIG. 8D is a side view of cover 820 including second chamfered perimeter 823, a single continuous integral engagement portion 826 having an engagement length that is equal to or substantially equal to the cover length, an engagement thickness, and an engagement surface opposite the first surface of the cover, the engagement surface being a V-configuration engagement surface formed by an obtuse angle. The V-configuration engagement surface provided along the engagement length. The obtuse angle is selected to accommodate a particular range of tubular diameters. Suitable obtuse angles are described herein. A portion of the engagement surface 830 may be in direct contact with an outer surface of the tubular.

FIG. 8E is a cross-section view of housing 800 including body 810 and cover 820 sealed with a sealing material 840. The body includes interior portion 819 and chamfered perimeter 817 (FIGS. 8A and 8B) including angled edge 817a. The cover 820 includes a V-configuration engagement surface 830 formed by an obtuse angle 830a (see also angle 830b which can be from about 1° to about 15°, from about 2° to about 12°, from about 3° to about 10°, from about 4° to about 8°, from about 5° to about 7°, about 5°, about 6°, or about 7°) the V-configuration surface provided along the engagement length. The cover includes chamfered perimeter 823 (FIGS. 8C and 8D) that may include cover edges, for example, cover edges 823a and 823b, sufficient to create a space upon engagement with a first perimeter 823 of a body portion 810. Chamfered perimeters 817 and 823 are configured such that upon engagement, a space 850 is created and defined by chamfered edges of the chamfered perimeters 817 and 823, where upon sealing with a sealing material, the sealing material fills the space 850 resulting in an improved seal. For exemplary purposes only, upon engaging cover 820 with body 810 via the first and second chamfered perimeters, a space is created between angled body edge 817a of body 810 and cover edges 823a and 823b of cover 820 such that the space 850 created is defined by edges 817a, 823a, and 823b, where upon sealing with a sealing material, the sealing material fills the space 850 resulting in an improved seal.

FIG. 7F is a cross-section view of cover 820 along section a-a, including body 810, interior portion 819, and first chamfered perimeter 817 including angled edge 817a whereby upon engaging cover 820 with body 810 via the first and second chamfered perimeters, a space 850 is created between angled body edge 817a of body 810 and cover edges 823a and 823b of cover 820 (see e.g., FIG. 8E) such that the space 850 created is defined by edges 817a, 823a, and 823b, where upon sealing with a sealing material, the sealing material fills the space 850 resulting in an improved seal.

FIG. 8G is a cross-section view of cover 820 taken along section h-h of FIG. 8D, including cover 820, second chamfered perimeter 823, and V-configuration engagement surface 830, and malleable wire 842.

Methods

The method for monitoring fluid flow within a wellbore uses a plurality of communications nodes situated along a casing string to accomplish a wireless transmission of data along the wellbore. The data represents signals that indicate the presence of fluid adjacent selected communications nodes.

The method first includes running a tubular body into the wellbore. The tubular body is formed by connecting a series of pipe joints end-to-end, with the pipe joints being connected by threaded couplings. The joints of pipe are fabricated from a steel material suitable for conducting an acoustical signal.

The tubular body may be a string of production tubing. Alternatively, the tubular body may be a string of casing. In this instance, the wellbore may have more than one casing string, including a string of surface casing, one or more intermediate casing strings, and a production casing. In any aspect, the wellbore is completed for the purpose of conducting hydrocarbon recovery operations.

A series of communications nodes is attached to the joints of pipe according to a pre-designated spacing. The communications nodes will include a topside communications node that is placed along the wellbore proximate the surface. This is the uppermost communications node along the wellbore. The topside communications node may be placed below grade, such as on an uppermost joint of casing or tubing, either below ground or in a cellar. Alternatively, the topside communications node may be placed above grade by connecting that node to the well head.

The communications nodes will also include a plurality of subsurface communications nodes. In one aspect, each joint of pipe receives a subsurface communications node. Each of the subsurface communications nodes may be attached to a joint of pipe by one or more clamps, or using an adhesive material or welding.

The subsurface communications nodes are configured to transmit acoustic waves up to the topside node. Each subsurface communications node includes a transceiver that receives an acoustic signal from a previous communications node, and then transmits or relays that acoustic signal to a next communications node, in node-to-node communications arrangement. The topside communications node then transmits signals from an uppermost subsurface communications node to a receiver at the surface.

One or more sensors are provided along at least each production zone of the wellbore of a multi-zone production well. The sensors operate to measure parameters indicative of fluid flow, in accordance with the presently described subject matter. The sensors may include but are not limited to the sensors described herein including any one or more of, for example, flow measurement devices, flow distribution measurement devices, fluid velocity sensors, pressure sensors, multiphase flow sensors, fluid density sensors, ultrasound sensors, Doppler shift sensors, microphones, chemical sensors, imaging devices, fluid identification sensors, impedance, attenuation, and temperature sensors. Selected subsurface sensor communications nodes will either house or will be in electrical communication with a respective sensor. For example, three or more subsurface sensor communications nodes will receive signals from a flow measurement device. These selected subsurface sensor communications nodes can be placed along a subsurface formation where production is taking place, for example, in each production zone. These selected nodes are referred to as sensor communications nodes.

Selected subsurface sensor communications nodes may house (or be in electrical communication with) a fluid probe and/or a material probe in accordance with the presently described subject matter. Such probes can include, but are not limited to, for example, a fluid identification sensor, a flow meter. Selected subsurface sensor communications nodes may house (or be in electrical communication with) a temperature sensor. Each of these communications nodes are again referred to as sensor communications nodes.

The sensor communications nodes receive electrical signals from the sensors, and then generate an acoustic signal using an electro-acoustic transducer. The acoustic signal corresponds to readings sensed by the respective sensors. The transceivers in the subsurface communications nodes then transmit the acoustic signals up the wellbore, node-to-node.

Additionally, a receiver is placed at the surface. The receiver has a processor that processes signals received from the topside communications node, such as through the use of firmware and/or software. The receiver preferably receives electrical or optical signals via a so-called "Class I, Division I" conduit or through a radio signal. The processor processes signals to identify which signals correlate to which sensor communications node that originated the signal. In this way, the operator will understand the depth or zone at which the readings are being made.

The method next includes transmitting signals from each of the communications nodes up the wellbore and to the receiver. The signals are acoustic signals that have a resonance amplitude. These signals are sent up the wellbore, node-to-node. In one aspect, piezo wafers or other piezoelectric elements are used to receive and transmit acoustic signals. In another aspect, multiple stacks of piezoelectric crystals or other magnetostrictive devices are used. Signals are created by applying electrical signals of an appropriate frequency across one or more piezoelectric crystals, causing them to vibrate at a rate corresponding to the frequency of the desired acoustic signal.

In one aspect, the data transmitted between the nodes is represented by acoustic waves according to a multiple frequency shift keying (MFSK) modulation method. Although MFSK is well-suited for this application, its use as an example is not intended to be limiting. It is known that various alternative forms of digital data modulation are available, for example, frequency shift keying (FSK), multi-frequency signaling (MF), phase shift keying (PSK), pulse position modulation (PPM), and on-off keying (OOK). In one embodiment, every 4 bits of data are represented by selecting one out of sixteen possible tones for broadcast.

Acoustic telemetry along tubulars is characterized by multi-path or reverberation which persists for a period of milliseconds. As a result, a transmitted tone of a few milliseconds duration determines the dominant received frequency for a time period of additional milliseconds. The communication nodes may determine the transmitted frequency by receiving or "listening to" the acoustic waves for a time period corresponding to the reverberation time, which is typically much longer than the transmission time. The tone duration can be long enough that the frequency spectrum of the tone burst has negligible energy at the frequencies of neighboring tones, and the listening time must be long enough for the multipath to become substantially reduced in amplitude. In one embodiment, the tone duration is 2 ms, then the transmitter remains silent for 48 milliseconds before sending the next tone. The receiver, however, listens for 2+48=50 ms to determine each transmitted frequency, utilizing the long reverberation time to make the frequency determination more certain. The energy required to transmit data is reduced by transmitting for a short period of time and exploiting the multi-path to extend the listening time during which the transmitted frequency may be detected.

In one embodiment, an MFSK modulation is employed where each tone is selected from an alphabet of 16 tones, so that it represents 4 bits of information. With a listening time of 50 ms, for example, the data rate is 80 bits per second.

The tones are selected to be within a frequency band where the signal is detectable above ambient and electronic noise at least two nodes away from the transmitter node. In this way, if one node fails, it can be bypassed by transmitting data directly between its nearest neighbors above or below. The tones may be evenly spaced in period within a frequency band from about 50 kHz to about 500 kHz, from about 50 kHz to about 300 kHz, from about 60 kHz to about 200 kHz, from about 65 kHz to about 175 kHz, from about 70 kHz to about 160 kHz, from about 75 kHz to about 150 kHz, from about 80 kHz to about 140 kHz, from about 85 kHz to about 135 kHz, from about 90 kHz to about 130 kHz, or from about 100 kHz to about 125 kHz. The tones may be evenly spaced in frequency within a frequency band from about 100 kHz to 125 kHz.

The nodes can employ a "frequency hopping" method where the last transmitted tone is not immediately re-used. This prevents extended reverberation from being mistaken for a second transmitted tone at the same frequency. For example, 17 tones are utilized for representing data in an MFSK modulation scheme; however, the last-used tone is excluded so that only 16 tones are actually available for selection at any time.

The communications nodes will transmit data as mechanical waves at a rate exceeding about 50 bps.

The signals are analyzed to determine the presence or nature of fluid flow. Where the sensors are fluid measurement devices, the presence or even the volume of fluid flow is measured. Where the sensors are fluid identification sensors, the nature of the fluid, e.g., oil vs. water vs. gas, is learned. Where the sensors are temperature sensors, temperature data is gathered. Where the sensors are piezoelectric transducers or microphones, sound or seismic or vibrational or wave data may be gathered. Where the sensors are pressure sensors, pressure data is gathered. Pressure drop may be measured across an inflow control device downhole. For example, an orifice plate may be placed in a tubing with pressure sensors measuring the pressure differential on either side of the plate.

Changes in temperature and pressure and sound may be indicative of changes in fluid flow or phase. The communications nodes generate signals that correspond to any or all of these wellbore fluid parameters.

In one aspect, analyzing the signals means reviewing historical data as a function of wellbore depth. For example, a chart or graph showing changes in temperature or changes in pressure at a specific zone as a function of time may be provided. In another aspect, analyzing the signals means comparing sensor readings along various zones of interest. In this way, a temperature profile or a fluid identification profile or a flow volume profile along the wellbore may be created. In yet another aspect, analyzing the signals means acquiring numerical data and entering it into reservoir simulation software. The reservoir simulator may then be used to predict future pressure changes, earth subsidence (which influences hardware integrity), fluid flow trends, or other factors.

A next step may be the identification of a subsurface communications node that is sending signals indicative of a need for remedial action along the wellbore. Such signals may be signals indicative of poor well performance, including for example, poor fluid flow, of a loss of pressure, or of gas or water breakthrough. Accordingly, the method may further include the step of optimizing production performance, including for example, but not limited to, actuating an inflow control device to adjust fluid flow along the wellbore, which may comprise sending an acoustic signal down the subsurface communications nodes and to the sensor communications nodes, where an electrical signal is then sent to the inflow control device. The inflow control device has a controller, powered, for example, by batteries, that will open or close a sleeve as desired to improve or optimize well performance.

Each of the communications nodes has an independent power source. The independent power source may be, for example, batteries, e.g., lithium batteries, or a fuel cell. Having a power source that resides within the housing of the communications nodes reduces the need for passing electrical connections through the housing, which could compromise fluid isolation. In addition, each of the intermediate communications nodes has a transducer and associated transceiver.

A signal may he sent from the surface to the communications nodes to switch them into a low-power, or "sleep," mode. This preserves batter life when real-time downhole data is not needed. The communications nodes may be turned back on to generate a flow profile along selected zones of the wellbore. In one aspect, the communications nodes are turned on prior to beginning an acid stimulation treatment. The sensors downhole will measure the flow rate of the stimulation fluid moving past each sensor communications node and out into the formation. In this way, real time information on the outflow profile is gathered. In a similar way, outflow data may be gathered where the wellbore is used as an injection well for water flooding or other secondary recovery operations.

A separate method for monitoring the flow of fluids in a production wellbore is provided herein. The method relies upon an acoustic telemetry system for transmitting signals indicative of fluid flow along production zones of a wellbore.

The method first includes receiving signals from a wellbore. Each signal defines a packet of information having (i) an identifier for a subsurface communications node originally transmitting the signal, and (ii) an acoustic waveform for the subsurface communications node originally transmitting the signal. The acoustic waveform is indicative of a wellbore fluid flow parameter or condition accordingly to the presently described subject matter. The fluid flow condition may include, but is not limited to, any one or more of (i) fluid flow volume, (ii) fluid identification, (iii) pressure. (iv) temperature, (v) impedance, (vi) fluid velocity, (vii) fluid density, (viii) fluid flow type, (ix) fluid composition, or (x) combinations thereof.

The method may also include correlating communications nodes to their respective locations in the wellbore. In addition, the method comprises procesing the amplitude values to evaluate fluid flow conditions in the wellbore.

In this method, the subsurface communications nodes may be constructed in accordance with communications node according to the presently described subject matter, or other arrangement for acoustic transmission of data. Each of the subsurface communications nodes can be attached to an outer wall of the tubing or the casing string according to a pre-designated spacing. The subsurface communications nodes are configured to communicate by acoustic signals transmitted through the wall of a tubular body.

The parameters indicative of fluid flow can be detected by sensors residing along a subsurface formation. The fluid flow conditions can be detected by sensors residing along the production tubing. The sensors may include, but are not limited to, any one or more of: (i) fluid velocity measurement devices residing inside of the production tubing; (ii) temperature sensors that measure temperature of fluids flowing inside of the production tubing; (iii) pressure sensors that measure pressure inside of the production tubing, or pressure drop; (iv) fluid density sensors that measure the density of fluids inside of the production tubing; (v) microphones that provide passive acoustic monitoring to listen for the sound of gas entry into the production tubing or the opening and closing of the gas lift valve; (vi) ultrasound sensors that correlate changes in gas transmission with gas flows, bubbles, solids and other properties of flow along gas inlets; (vii) Doppler shift sensors; (viii) chemical sensors; (ix) an imaging device; and (x) combinations thereof to produce direct or "virtual" sensors of flows of gas, liquids and solids.

Electrical, electro-magnetic or fiber optic signals are sent from the sensors to selected subsurface communications nodes. Electro-acoustic transducers within the sensor communications nodes, in turn, send acoustic signals to a transceiver, which then transmits the signals acoustically. The transceivers in the selected subsurface communications nodes transmit acoustic signals up the wellbore representative of the fluid flow readings, node-to-node. Signals are transmitted from the sensor communications nodes to a receiver at a surface through a series of subsurface communications nodes, with each of the subsurface communications nodes being attached to an outer wall of the production tubing or casing according to a pre-designated spacing, where each production zone comprises at least one sensor and at least one sensor communications node, where the sensor may or may not reside within the housing of its associated sensor communications node.

The methods described above may be practiced either before or after a wellbore has been completed. For example, after a portion of a wellbore has been drilled, a casing crew may be brought in to run casing into the wellbore. The casing crew will be trained in how to install subsurface communications nodes onto an outer wall of the production tubing and/or joints of casing. The communications nodes are clamped onto the pipe joints during run-in to form a wireless acoustic telemetry system. After all of the casing strings are in place and the production tubing is in place, the communications nodes are activated. Signals are delivered from fluid flow sensors, provided in each production zone of a multi-zone production zone, to sensor communications nodes. Those nodes transmit the signals as acoustic signals via a plurality of intermediate communications nodes and a topside communications node, node-to-node, up to a receiver at the surface. The acoustic signals are packets of information that identify the sensor communications node sending the original waveform, and the fluid flow data.

Each communications node may contain a piezoelectric device to allow acoustic communication to nearby nodes. Each node is independently powered by, for example, an internal battery or fuel cell. The nodes may include memory chips to store data.

The presently described systems and methods can be used to assess zonal fluid flow, and assess production conditions in a multi-zone, multiphase fluid producing well. The information generated can be used to generate maps and/or diagnose production problems, including for example, identifying dead production zones, cross-flow, contamination, plugging, reduced production, lost circulation, paraffin buildup/breakout, water-cut, corrosion, and the like.

The presently described subject matter, in another aspect, provides optimization of production performance to improve production efficiency, output, quality, composition, and the like, in one or more production zones of a multi-zone, multiphase fluid producing well. Optimization can include any of chemical optimization, including, but not limited to, for example the use of scavengers, inhibitors, anti-corrosives, chemically consolidating to strengthen a formation, and the like as described herein; mechanical treatment including for example, the use of artificial lift systems, flow restriction (using a back pressure regulator), injection, e.g., oil or water, and/or gravel packs and screen, e.g., to reduce sand, etc.; heat treatment, for example, chemical, mechanical and heat can be used to treat paraffin issues; and sealing to remedy lost circulation issues. Other optimization methods can include adjusting pump speed and/or casing pressure; zonal flow control; and for off-shore applications, employing the use of electrical submersible pumping systems.

As can be seen, a novel downhole telemetry system is provided, as well as a novel method for the wireless transmission of information using a plurality of data transmission nodes for monitoring the presence of fluid flow. The presently described subject matter improves well performance by using attachable sensors to measure flow rates and other data along the wellbore, along with downhole devices to reconfigure the completion and/or other devices to improve and/or optimize well performance.

Method 1: Zonal Sensing of Production Fluid and Rate

For a multi-zone production well, it is important to know what material and how much is produced in each zone, which provides information needed for intervention or control. To obtain this information, a sensing method is described in which one or more sensing nodes are placed in each producing zone, as shown in FIG. 9. Each sensor communications node can comprise or consist of a material probe to measure parameters related to material properties surrounding the node, and a flow probe to measure the parameters associated with local flow rate.

The material probe is a sensing device or method that measures the acoustic energy loss to the surrounding medium and uses this information to determine the nature of the medium, including but not limited to, for example, one or more of gas, water, oil, or a mixture thereof. For example, when the piezo transducer on the pipe is excited by an electrical voltage pulse, it converts electrical energy into acoustic energy on the pipe. Part of the acoustic energy will propagate along the pipe wall and part will be leaked into the medium. The amount of energy lost to the medium depends on the difference between acoustic impedances of the metal wall and the medium. For example, the energy loss to water is much more than gas because of water's better impedance match with the metal wall. The energy loss to oil is even more than water because of additional loss of shear wave energy. From energy conservation point of view, the more energy loss to the medium, more electrical energy required to drive the piezo provided that energy dissipation within the piezo is relatively constant. Described are two different methods to determine the acoustic energy loss to the medium—one is to measure electrical impedance of the piezo, as shown in FIG. 10 and another one is to measure acoustic attenuation with Pulse-Echo/Tx-Rx method. Both methods, once calibrated, will provide the information that differentiates gas, water, oil or any mixture thereof.

The flow probe is a noise meter that is calibrated with flow rate through a hole of given geometry. Both internal and external studies have demonstrated that the intensity of flow noise correlates with flow rate in a pipe flow with regard to single-phase flow. Flow noise in audio frequency range is measured with a piezo transducer in node and the intensity indicates an overall measure of flow rate.

By combining the material measurement with flow noise for each production zone and transmitting this information to the surface via an acoustic network, the production condition of each production zone can be assessed, as well as the relative performance of each production zone at any time as necessary.

Method 2: Average Phase Composition and Flow Rate

In this method, a known distance between a pair of nodes on the tubular and their respective communication signals are used as to estimate information related to the average phase composition and flow rate of flowing fluid medium between two nodes. This method is illustrated in FIG. 11. FIG. 11 illustrates fluid flow in the direction from node 2 to node 1. When node 2 transmits a short ultrasonic pulse, the waves propagate to node 1 along two distinct paths, i.e., within the pipe wall and within the medium inside the pipe. Since the traveling velocity in the medium is much slower than those within the pipe wall, the signal of the pressure wave along the medium path will arrive at the node 1 much later, and can be effectively separated from the signal via the metal wall. Therefore, the flight time of the pressure wave inside the pipe from node 2 to node 1 can be measured and is related to sound speed and flow velocity as:

$$t_2 = d/(c+v).$$

Similarly, node 1 can also to transmit a pulse of different frequency, which generates a pressure wave inside the pipe that propagates to node 2 against the flow, and the flight time of this wave can be expressed as:

$$t_2 = d/(c-v),$$

where d is the distance between two nodes, c is the average wave velocity and v is average flow velocity. Then the average wave and flow velocities can be estimated as follows:

$$c = d/2/\{1/t_1 1/t_2\} \text{ and } v = d/2\{1/t_1 1/t_2\}.$$

The speed of sound depends on the material composition. The speed of sound of mixture of, for example, a multiphase fluid, including but not limited to, for example, two or more of gas, water, and oil, depends on the fraction of each phase. Therefore the average speed of sound can be used to determine the phase composition of a multiphase fluid.

Method 3: Flow Distributions Across Tubular with Multi-Inserted Pitot-Tube Like Sensors In combination with other methods described herein (to improve flow measurements), or singularly, this method includes inserting a plurality, for example, two or more, Pitot-tubes of a pitot-tube like device into different depths in a tubular with multiphase flows. A pitot tube measures the velocity of only a filament of liquid, and thus, it can be used for exploring the velocity distribution across the pipe cross-section. Each pitot tube is in communication with a respective piezoelectric transducer provided on the outside of the tubular.

FIG. 12 illustrates the pitot-tube like devices including a plurality of pitot tubes 1210, 1220, each inserted to different depths in the tubular, to give a "flow profile" as vibrations/sound will vary with flow rate and fluid composition as a function of distance from center of the tubular. This is accomplished by inserting the devices at a stage from well completion, to production, and workovers or abandonment. In FIG. 12, one method is shown where the "signals" from tubes at different position across the flow are monitored by piezoelectric transducers external to the tubular. This has the advantage of avoiding the need to penetrate the tubular other than the Pitot-tube like devices that can be inserted from the inside of tubular, and can be friable, removable later by drilling, or retracted.

The pitot array sensor can include two or more pitot-tubes each inserted at a different depth into a tubular about its circumference, in a single plane or staggered along the length of a production zone of the multi-zone production well. A plurality of pitot-tubes can include, but is not limited to, from 2 to 30 tubes, from 3 to 25 tubes, from 3 to 20 tubes, from 4 to 15 tubes, from 5 to 10 tubes, from 3 to 15 tubes, from 5 to 15 tubes, from 5 to 20 tubes, from 5 to 7 tubes, 3 tubes, 4 tubes, 5 tubes, 6 tubes, 7 tubes, 8 tubes, 9 tubes, 10 tubes, 11 tubes, 12 tubes, 13 tubes, 14 tubes, 15 tubes, 16 tubes, 17 tubes, 18 tubes, 19 tubes, or 20 pitot tubes. Each inserted pitot tube is in communication with a respective piezoelectric transducer provided on the outside of the tubular, e.g., clamped or otherwise attached, e.g., mechanically or chemically. The plurality of pitot tubes, each in communication with a respective piezoelectric transducer, is referred to herein as a "pitot array sensor."

Alternatively or additionally, dynamic or static pressure measurement devices can be used inside or outside of the tubular in place of the described Pitot-tube like devices, and would behave much like a conventional Pitot tube. Suitable devices can include orifice plates, flow nozzle or Venturi tubes which are flow measuring devices that utilize differential pressure to measure volumetric flow.

With regard to the described Pitot-tube like devices, in combination with other acoustic, temperature or additional measurements of flows, the direct measurements can be used to quantify flows, and/or provides a unique measure of flow distribution across a tubular without running a production logging tool or PLT.

The presently described systems and methods do not employ a PLT, or can employ a PLT.

Further illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

INDUSTRIAL APPLICABILITY

The systems, methods, and disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. An in-situ system for assessing production conditions of one or more production zones of a fluid producing well comprising at least one production zone, the system comprising:
   at least one sensor disposed along a tubular body in the production zone of the fluid producing well, each sensor configured to measure a parameter indicative of fluid flow within production tubing in that zone;
   at least one sensor communications node placed along and affixed to a wall of the tubular body in that production zone, the at least one sensor communications node being in communication with at least one associated sensor and configured to receive signals therefrom;
   a topside communications node;
   one or more intermediate communications nodes spaced along and attached to the wall of the tubular body, wherein the intermediate communications nodes are configured to transmit signals received from the sensor communications node(s) to the topside communications node, in substantially a node-to-node communications arrangement;
   a receiver at a well surface configured to receive signals from the topside communications node; and
   a topside data acquisition system structured and arranged to communicate with the topside communications node;
   wherein each of the at least one sensors includes a material probe to measure parameters related to material properties with the fluid surrounding the sensor, wherein the material probe is a piezoelectric transducer configured to be excited to propagate acoustic energy along the tubular body; wherein a composition of the fluid in the tubular body can be determined based on a level of the propagated acoustic energy lost to the fluid in the tubular body.

2. The system of claim 1, wherein the fluid producing well is a multi-zone fluid producing well.

3. The system of claim 1, wherein at least one sensor resides within the sealed housing of its associated sensor communications node.

4. The system of claim 1, wherein the well surface is an earth surface or a production platform offshore.

5. The system of claim 1, wherein each of the one or more intermediate communications nodes and/or each of the at least one sensor communications nodes are configured to transmit acoustic waves, radio waves, low frequency electromagnetic waves, inductive electromagnetic waves, light, or combinations thereof.

6. The system of claim 1, wherein each of the one or more intermediate communications nodes and each of the at least one sensor communications nodes are configured to transmit acoustic waves, providing near real-time information to the topside data acquisition system.

7. The system of claim 6, wherein each of the one or more intermediate communications nodes and each of the at least one sensor communications nodes comprises a sealed housing, a power source residing within the sealed housing, and at least one electro-acoustic transducer.

8. The system of claim 7, wherein each of the one or more intermediate communications nodes further comprises a transceiver associated with the at least one electro-acoustic transducer configured to receive and relay the acoustic waves.

9. The system of claim 7, wherein the at least one sensor communications node further comprises a transceiver associated with the at least one electro-acoustic transducer that is configured to communicate with the at least one sensor and transmit acoustic waves in response thereto.

10. The system of claim 9, wherein the acoustic waves represent asynchronous packets of information comprising a plurality of separate tones, with at least some of the acoustic waves being indicative of a sensed parameter.

11. The system of claim 10, wherein a frequency band for the acoustic wave transmission by the transceivers operates from 80 kHz to 105 kHz.

12. The system of claim 7, wherein each of the at least one sensors resides within the housing of its associated sensor communications node, and the electro-acoustic transducer within the associated sensor communications node converts signals from the sensor into acoustic signals for an associated transceiver.

13. The system of claim 6, wherein the acoustic waves provide data that is modulated by (i) a multiple frequency shift keying method, (ii) a frequency shift keying method, (iii) a multi-frequency signaling method, (iv) a phase shift keying method, (v) a pulse position modulation method, or (vi) an on-off keying method.

14. The system of claim 1, wherein the at least one sensor employs passive acoustic monitoring, active acoustic measurements, electrical-acoustic impedance measurements, electromagnetic signature detection, sonar monitoring, radar monitoring, or radiation monitoring.

15. The system of claim 1, wherein data transmitted topside is utilized by the topside data acquisition system for assessing production conditions of a production zone of a multi-zone fluid producing well.

16. The system of claim 1, wherein the intermediate communications nodes are spaced apart such that each intermediate communications node resides on its own joint of production tubing.

17. The system of claim 1, wherein the intermediate communications nodes are spaced at about 10 to 1,000 foot (3.0 to 304.8 meter) intervals; and the transceivers transmit data in acoustic form at a rate exceeding about 50 bps.

18. The system of claim 1, further comprising, for at least one production zone of the fluid producing well, one or more production optimization control devices.

19. The system of claim 18, wherein the one or more production optimization control devices are selected from an inflow control device, an autonomous inflow control device, an outflow control device, an actuated downhole shut-off valve, and an isolation device.

20. An in-situ method for assessing production conditions of one or more production zones of a multi-zone fluid producing well, comprising:
   sensing one or more fluid flow parameters via at least one sensor positioned along a tubular body in at least one production zone of the multi-zone fluid producing well;
   receiving signals from the at least one sensor with at least one sensor communications node attached to a wall of the tubular body;
   transmitting the received signals via a transceiver to an intermediate communications node attached to the wall of the tubular body;
   relaying signals received by the intermediate communications node to an additional intermediate communications node via a transceiver;
   relaying signals received by the additional intermediate communications node to a topside communications node via a transceiver;
   assessing a production condition of each production zone in response to signals received from the topside communications node; and
   optimizing production performance of one or more production zones of the multi-zone fluid producing well;
   wherein the production condition is a composition of the fluid in the tubular body, and wherein each of the at least one sensors includes a material probe to measure parameters related to material properties with the fluid surrounding the sensor, wherein the material probe is a piezoelectric transducer, and wherein the method further comprises:
   exciting the piezoelectric transducer to propagate acoustic energy along the tubular body;
   determining acoustic energy lost to the fluid in the tubular body; and
   based on a level of acoustic energy loss, determining the composition of the fluid in the tubular body.

21. The method of claim 14, wherein the intermediate communications nodes are configured to transmit acoustic waves, radio waves, low frequency electromagnetic waves, inductive electromagnetic waves, light, or combinations thereof.

22. The method of claim 14, wherein the step of transmitting the signals received from the one or more sensors via a transceiver employs the at least one sensor communications node configured to transmit acoustic waves, radio waves, low frequency electromagnetic waves, inductive electromagnetic waves, light, or combinations thereof.

23. The method of claim 14, wherein the intermediate communications nodes and the at least one sensor communications node are configured to transmit acoustic waves, providing real-time information as to production conditions of a production zone.

24. The method of claim 14, wherein each of the intermediate communications nodes comprises a sealed housing; a power source residing within the housing; and at least one electro-acoustic transducer.

25. The method of claim 24, wherein each of the intermediate communications nodes further comprises a transceiver associated with the at least one electro-acoustic transducer structured and arranged to receive and relay the acoustic waves.

26. The method of claim 14, wherein the at least one sensor communications node comprises:
a sealed housing;
a power source residing within the housing; and
at least one electro-acoustic transducer.

27. The method of claim 26, wherein the at least one sensor communications node further comprises a transceiver associated with the at least one electro-acoustic transducer that is structured and arranged to communicate with the at least one sensor and transmit acoustic waves in response thereto.

28. The method of claim 27, wherein the acoustic waves represent asynchronous packets of information comprising a plurality of separate tones, with at least some of the acoustic waves being indicative of a sensed property.

29. The method of claim 14, wherein each of the at least one sensor communications nodes is configured to receive signals from the associated sensor, and transmit acoustic signals indicative of readings taken by the at least one sensor.

30. The method of claim 14, wherein the production condition further comprises a flow rate of the fluid in the tubular body, and wherein each of the at least one sensors includes a flow probe to measure parameters associated with the flow rate of the fluid adjacent the sensor, wherein the flow probe is a piezoelectric noise meter, and wherein the method further comprises:
using the piezoelectric noise meter, measuring an intensity of flow noise in the tubular body; and
based on a correlation between flow noise and flow rate, determining the flow rate of
the fluid in the tubular body.

31. An in-situ method for assessing production conditions of one or more production zones of a multi-zone fluid producing well, comprising:
sensing one or more fluid flow parameters via at least one sensor positioned along a tubular body in at least one production zone of the multi-zone fluid producing well;
receiving signals from the at least one sensor with at least one sensor communications node attached to a wall of the tubular body;
transmitting the received signals via a transceiver to an intermediate communications node attached to the wall of the tubular body;
relaying signals received by the intermediate communications node to an additional intermediate communications node via a transceiver;
relaying signals received by the additional intermediate communications node to a topside communications node via a transceiver;
assessing a production condition of each production zone in response to signals received from the topside communications node; and
optimizing production performance of one or more production zones of the multi-zone fluid producing well;
wherein the production condition is a flow distribution at different depths in the tubular body, each of the at least one sensors comprising a pitot array sensor, the pitot array sensor including
a plurality of pitot tubes, each of the pitot tubes being inserted into the tubular body at
a different depth from others of the plurality of pitot tubes, and
a corresponding plurality of piezoelectric transducers, wherein each of the pitot tubes
is in communication with a respective piezoelectric transducer;
wherein the method further comprises:
using signals sensed by the pitot tubes and communicated to the respective piezoelectric transducers to determine the flow distribution in the tubular body.

32. An in-situ method for assessing production conditions of one or more production zones of a multi-zone fluid producing well, comprising:
sensing one or more fluid flow parameters via at least one sensor positioned along a tubular body in at least one production zone of the multi-zone fluid producing well;
receiving signals from the at least one sensor with at least one sensor communications node attached to a wall of the tubular body;
transmitting the received signals via a transceiver to an intermediate communications node attached to the wall of the tubular body;
relaying signals received by the intermediate communications node to an additional intermediate communications node via a transceiver;
relaying signals received by the additional intermediate communications node to a topside communications node via a transceiver;
assessing a production condition of each production zone in response to signals received from the topside communications node; and
optimizing production performance of one or more production zones of the multi-zone fluid producing well;
wherein the production condition is a flow velocity of fluid in the tubular body, and further comprising:
sending a first acoustic signal from a first intermediate communications node to a second intermediate communications node, wherein the second intermediate communications node is separated from the first intermediate communications node by a known distance;
measuring a first time required for the first signal to pass through fluid in the tubular body from the first intermediate communications node to the second intermediate communications node;
sending a second acoustic signal from the second intermediate communications node to the first intermediate communications node;
measuring a second time required for the second signal to pass through fluid in the tubular body from the second intermediate communications node to the first intermediate communications node; and
using the first time, the second time, and the known distance, determining the flow velocity of the fluid in the tubular body.

33. The method of claim 32, further comprising repeating the steps at a different time with respect to a previous time and measuring the change in acoustic response with between the different time and the previous time to determine whether a physical change in fluid flow has occurred.

34. The method of claim 32, wherein the production condition further includes a composition of the fluid in the tubular body, the method further comprising:

using the first time, the second time, and the known distance, determining a speed of sound in the fluid in the tubular body; and based on the speed of sound in the fluid, determining the composition of the fluid in the tubular body.

35. An in-situ method for assessing production conditions of one or more production zones of a multi-zone fluid producing well, comprising:

sensing one or more fluid flow parameters via at least one sensor positioned along a tubular body in at least one production zone of the multi-zone fluid producing well;

receiving signals from the at least one sensor with at least one sensor communications node attached to a wall of the tubular body;

transmitting the received signals via a transceiver to an intermediate communications node attached to the wall of the tubular body;

relaying signals received by the intermediate communications node to an additional intermediate communications node via a transceiver;

relaying signals received by the additional intermediate communications node to a topside communications node via a transceiver;

assessing a production condition of each production zone in response to signals received from the topside communications node; and optimizing production performance of one or more production zones of the multi-zone fluid producing well;

wherein the production condition comprises a flow rate of the fluid in the tubular body, and wherein each of the at least one sensors includes a flow probe to measure parameters associated with the flow rate of the fluid adjacent the sensor, wherein the flow probe is a piezoelectric noise meter, and wherein the method further comprises:

using the piezoelectric noise meter, measuring an intensity of flow noise in the tubular body; and based on a correlation between flow noise and flow rate, determining the flow rate of the fluid in the tubular body.

\* \* \* \* \*